United States Patent
Suzuki et al.

(10) Patent No.: US 7,384,148 B2
(45) Date of Patent: Jun. 10, 2008

(54) PROJECTION TYPE IMAGE DISPLAY APPARATUS AND OPTICAL SYSTEM

(75) Inventors: Hiroaki Suzuki, Saitama (JP); Tomoya Yano, Kanagawa (JP); Ken Kikuchi, Kanagawa (JP); Hiroaki Matsui, Tokyo (JP)

(73) Assignee: Sony Corporation, Tokyo (JP)

( * ) Notice: Subject to any disclaimer, the term of this patent is extended or adjusted under 35 U.S.C. 154(b) by 296 days.

(21) Appl. No.: 11/043,885

(22) Filed: Jan. 26, 2005

(65) Prior Publication Data

US 2005/0190342 A1 Sep. 1, 2005

(30) Foreign Application Priority Data

Jan. 30, 2004 (JP) .......................... P2004-024432

(51) Int. Cl.
G03B 21/14 (2006.01)
(52) U.S. Cl. ....................................... 353/20
(58) Field of Classification Search .................. 353/20, 353/31, 37, 81
See application file for complete search history.

(56) References Cited

U.S. PATENT DOCUMENTS 6,460,998 B1    10/2002  Watanabe
6,486,997 B1 *  11/2002  Bruzzone et al. ............. 359/247
6,563,551 B1 *   5/2003  Janssen et al. ............... 348/759

FOREIGN PATENT DOCUMENTS

| EP | 1 077 387 | 2/2001 |
|---|---|---|
| EP | 1 143 744 | 10/2001 |
| JP | 11-326834 | 11/1999 |
| JP | 2003-015086 | 1/2003 |
| JP | 2003-114404 | 4/2003 |
| JP | 2003-337222 | 11/2003 |
| JP | 2004-502189 | 1/2004 |
| WO | 00/63738 | 10/2000 |
| WO | 02/01884 | 1/2002 |

OTHER PUBLICATIONS

Japanese Office Action isued on Jul. 3, 2007.

* cited by examiner

*Primary Examiner*—Christopher Mahoney
(74) *Attorney, Agent, or Firm*—Sonnenschein Nath & Rosenthal LLP

(57) ABSTRACT

A projection type image display apparatus is disclosed which can achieve an improved polarized light demultiplexing characteristic with a simple configuration and can project an image of a high quality having a high contrast. The apparatus includes a polarizing beam splitter having a demultiplexing face inclined to 45 degrees with respect to a plane perpendicular to an optical axis, a linearly polarizing element in the form of a flat plate provided in front of the polarizing beam splitter, and a reflection type liquid crystal element provided at a next stage to the polarizing beam splitter. The linearly polarizing element is disposed perpendicularly to a reference plane which includes a normal to the demultiplexing face and the optical axis and is inclined at an acute angle in the opposite direction to the demultiplexing face with respect to the plane perpendicular to the optical axis.

22 Claims, 19 Drawing Sheets a: $\theta 1 = 60°, \Psi 1 = 0°$
b: $\theta 1 = 60°, \Psi 1 = 90°$
c: $\theta 1 = 60°, \Psi 1 = 180°$
d: $\theta 1 = 60°, \Psi 1 = 270°$

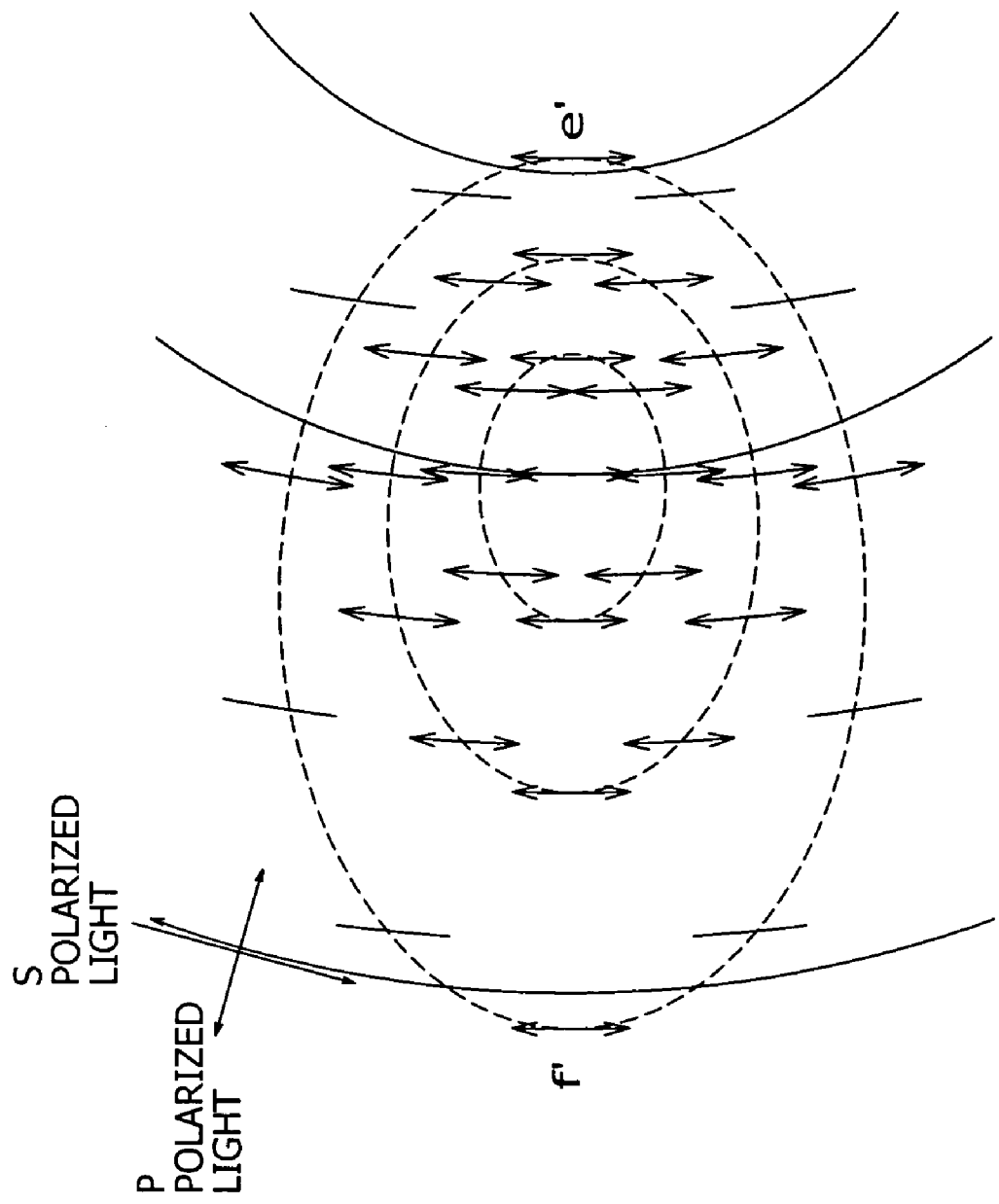

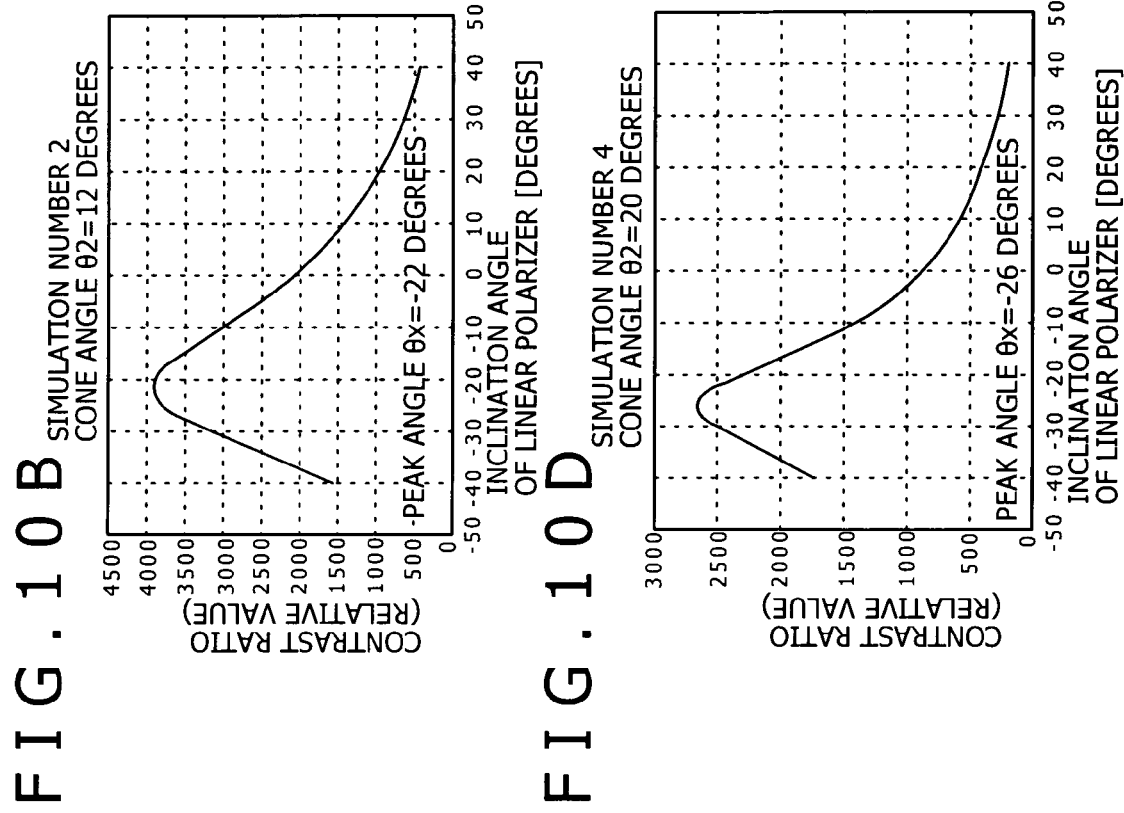
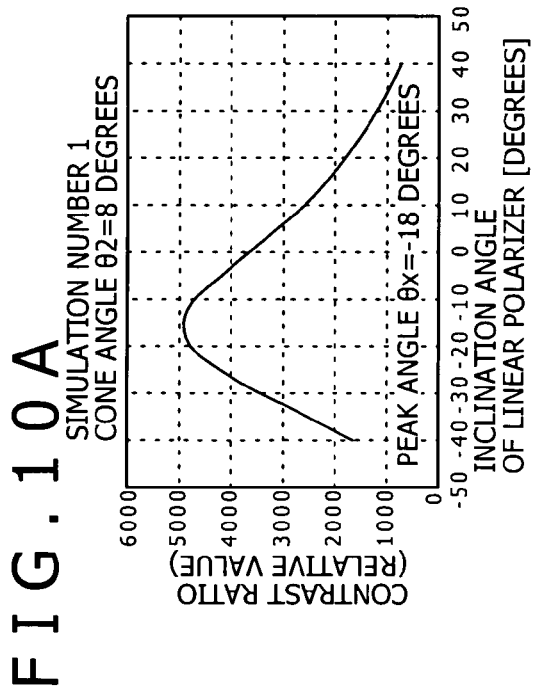
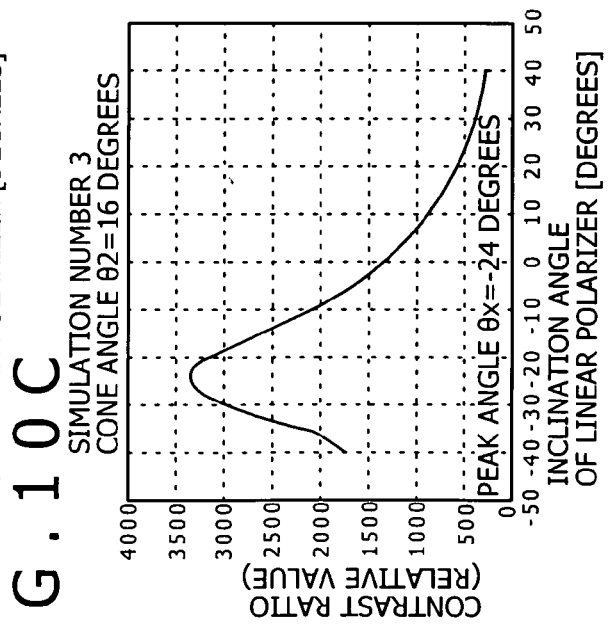

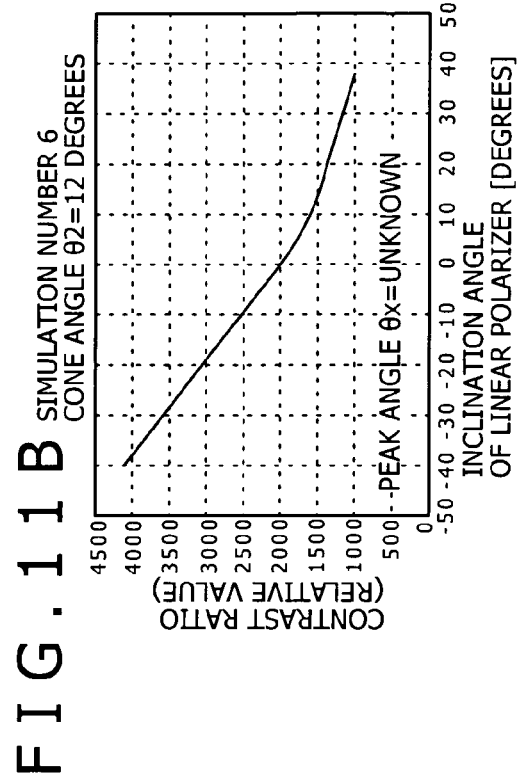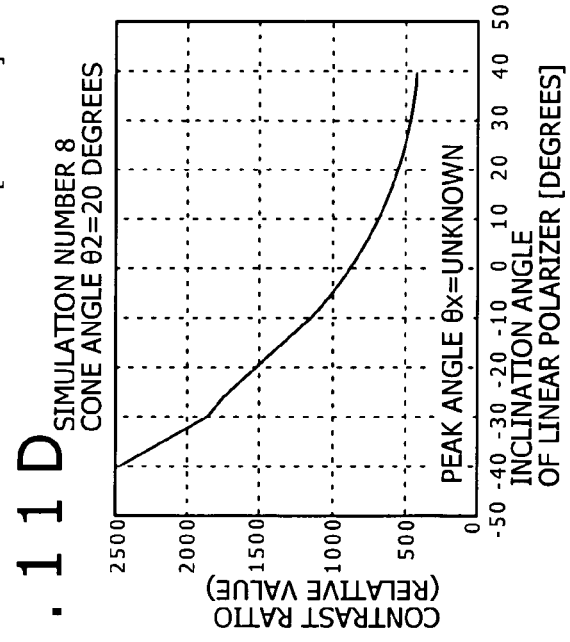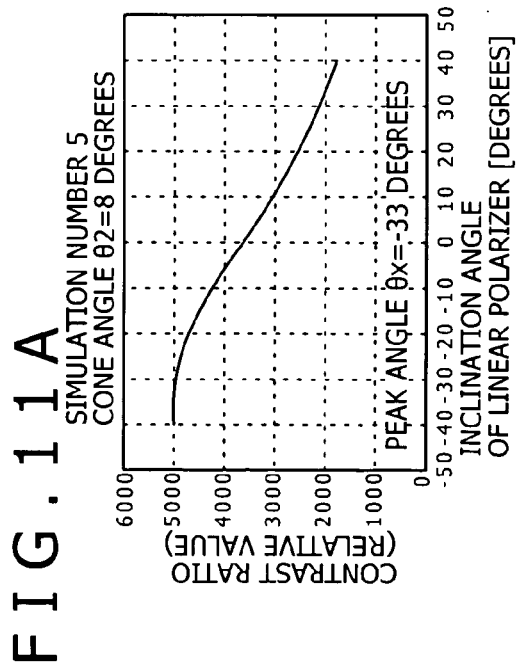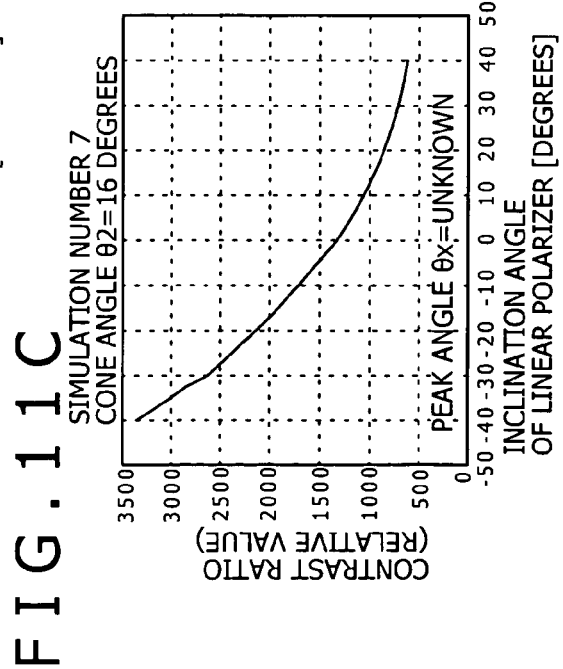

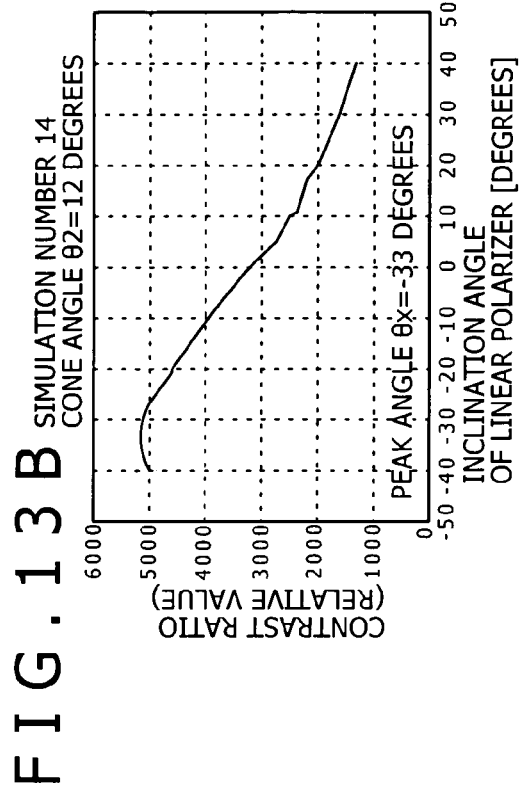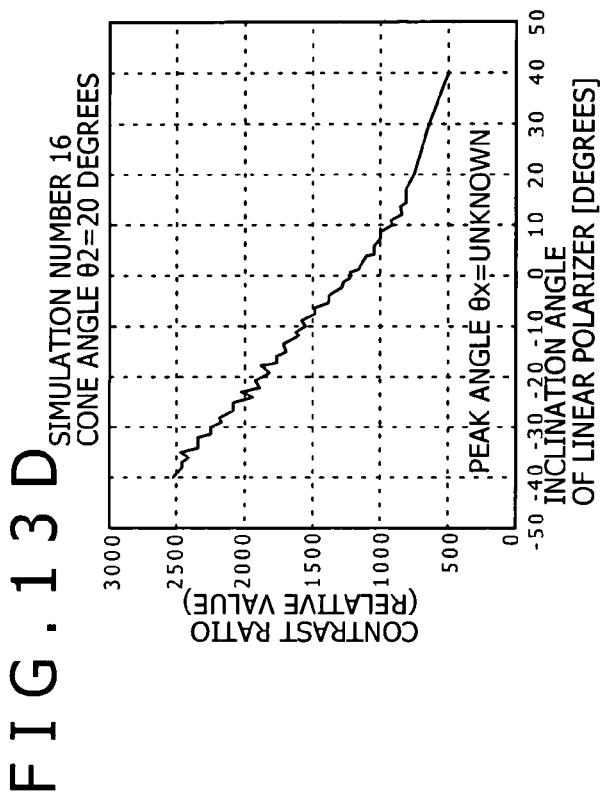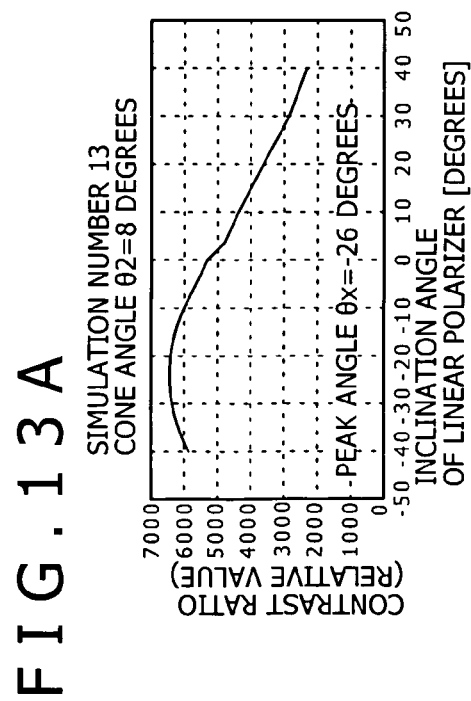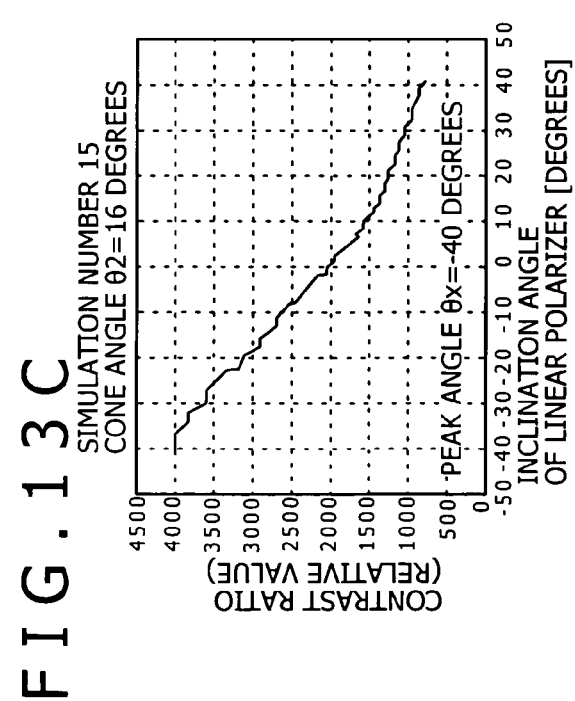

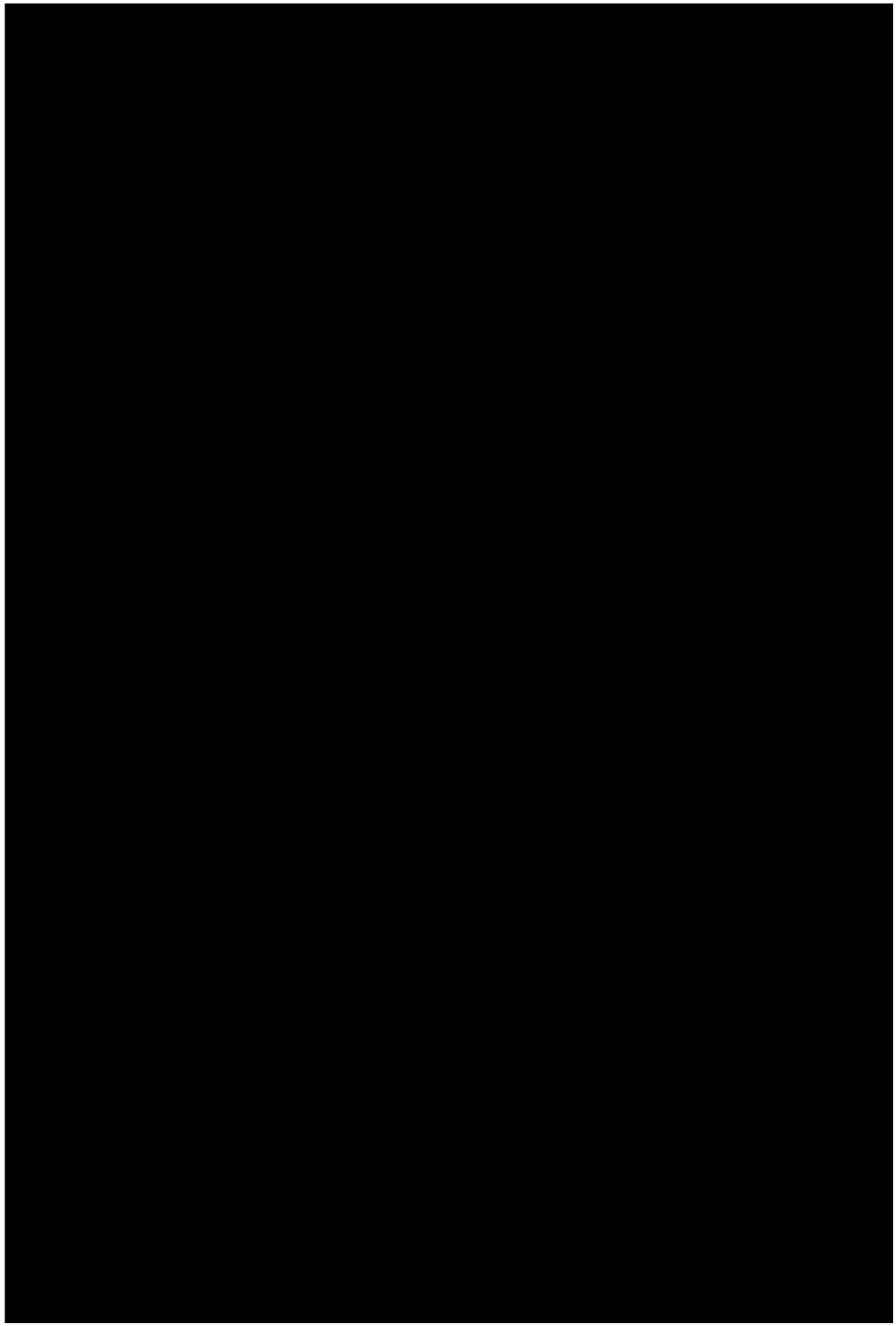

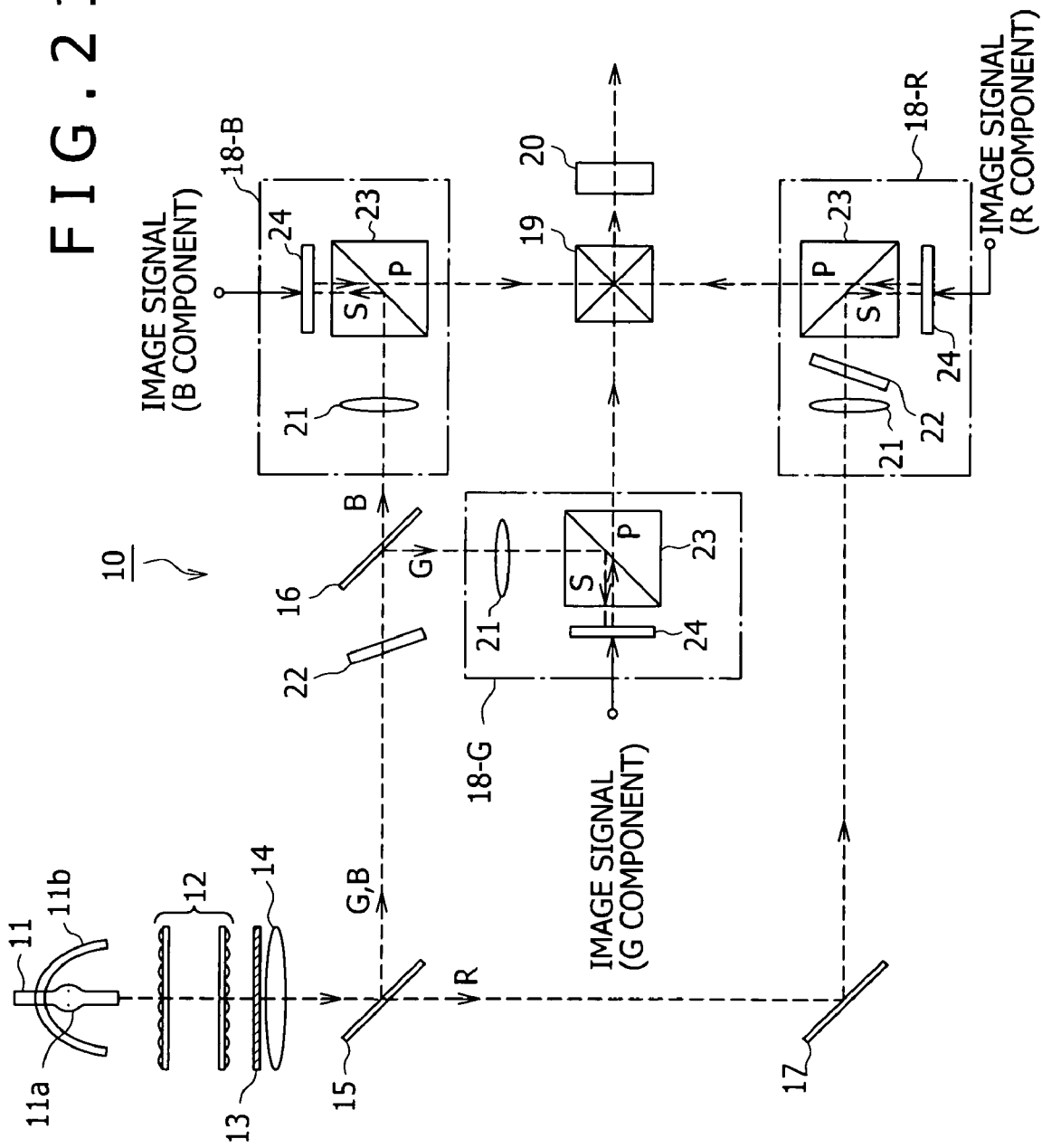

PROJECTION TYPE IMAGE DISPLAY APPARATUS AND OPTICAL SYSTEM

RELATED APPLICATION DATA

The present application claims priority to Japanese Application(s) No(s). P2004-024432 filed Jan. 30, 2004, which application(s) is/are incorporated herein by reference to the extent permitted by law.

BACKGROUND OF THE INVENTION

This invention relates to a projection type image display apparatus such as a liquid crystal projector of the reflection type and an optical system for use with a liquid crystal projector of the reflection type and the like.

A projection type image display apparatus is conventionally known which includes an illumination apparatus, a light modulation element for modulating illuminated light in accordance with an image signal, a demultiplexing optical system for illuminating light emitted from the illumination apparatus upon the light modulation element, and a projection optical system for projecting the light from the light modulation element to form an image. One of projection type image display apparatus of the type described is disclosed, for example, in Japanese Patent Laid-Open No. 2000-105360 (hereinafter referred to as Patent Document 1).

In the projection type image display apparatus, a discharge lamp is usually used as the light source, and a transmission type liquid crystal element, a DMD (Digital Micromirror Device) and the like are used frequently as the image modulation element. Further, in recent years, also a projection type image display apparatus has been put into practical use which uses a reflection type liquid crystal element having a higher resolution as the light modulation apparatus.

In the projection type image display apparatus, a light source which emits white light is used, and the white light from the light source is demultiplexed into lights of three colors of red, green and blue using a dichroic mirror. The lights of the colors are illuminated on corresponding light modulation elements. The light modulation elements individually modulate the illumination lights in accordance with red, green and blue image signals. Then, the illumination lights modulated by the light modulation elements are multiplexed by a color multiplexing element such as a cross prism and then projected on a screen through a projection lens.

Where a reflection type liquid crystal element is used as the light modulation element, polarized light is used. In this instance, light emitted from the light source is converted into light polarized in one direction using a polarization conversion element and then demultiplexed into lights of three colors, which are introduced to corresponding reflection type liquid crystal elements. FIG. 22 schematically shows a device configuration of a reflection type liquid crystal element and associated elements of a conventional projection type image display apparatus.

Referring to FIG. 22, the conventional projection type image display apparatus 110 shown includes a polarizing beam splitter (PBS) 111, a reflection type liquid crystal element 112, and a linearly polarizing element 113.

Where the polarization conversion element described above is used, it is difficult to obtain a high P-S conversion characteristic over a wide incident angle over the overall visible region. Therefore, in the conventional projection type image display apparatus 110, light is passed through the linearly polarizing element 113 to obtain a flux of light having a higher polarization degree, and the flux of light thus obtained is introduced into the polarizing beam splitter 111.

The flux of light introduced into the polarizing beam splitter 111 is reflected at the most part thereof by the polarizing beam splitter 111 and introduced to the reflection type liquid crystal element 112. Where the white is to be displayed, the flux of light is converted into P polarized light by the reflection type liquid crystal element 112 and is introduced back into the polarizing beam splitter 111. The P polarized light passes as it is through the polarizing beam splitter 111, whereafter the flux of light forms an image on the screen through the projection lens. On the other hand, where the black is to be displayed, the flux of light is reflected from the reflection type liquid crystal element 112 while it remains S polarized light and is introduced back to the polarizing beam splitter 111. Then, the S polarized light is reflected by the polarizing beam splitter 111 and returns to the original light path.

Incidentally, the projection type image display apparatus 110 which uses such a conventional reflection type liquid crystal element as described above has the following problems.

The linearly polarizing element 113 is located in front of the polarizing beam splitter 111 as seen in FIG. 22 so that only a flux of light polarized in one direction, for example, only a flux of S polarized light, is introduced into the polarizing beam splitter 111.

However, a ray of light which is not included in a meridional plane, that is, a skew light ray, includes, when it enters the polarizing beam splitter 111, not only an S polarized light component but also a P polarized light component. If the polarizing beam splitter 111 is ideal, then the P polarized light component passes through the polarizing beam splitter 111 and does not illuminate the reflection type liquid crystal element 112. Actually, however, also the P polarized light is partly reflected by the polarizing beam splitter 111 and enters the liquid crystal element.

As a result, for example, when the black is to be displayed, the P polarized light reflected by the polarizing beam splitter 111 is reflected by the reflection type liquid crystal element 112 and enters the polarizing beam splitter 111 again. Thereupon, most of the P polarized light passes through the polarizing beam splitter 111 and is projected to the screen, resulting in deterioration of the contrast of the image.

SUMMARY OF THE INVENTION

It is an object of the present invention to provide a projection type image display apparatus which can achieve an improved polarized light demultiplexing characteristic with a simple configuration and can project an image of a high quality having a high contrast.

It is another object of the present invention to provide an optical system which has an improved polarized light demultiplexing characteristic.

In order to attain the objects described above, according to an aspect of the present invention, there is provided a projection type image display apparatus, including a linearly polarizing element in the form of a flat plate for emitting light polarized in one direction from within a flux of light incident along an optical axis, a polarizing beam splitter disposed in an inclined relationship to a predetermined angle with respect to a plane perpendicular to the optical axis and having a demultiplexing face which passes S or P polarized light therethrough but reflects polarized light having a polarization direction perpendicular to that of the polarized light which passes through the demultiplexing face, the polarizing beam splitter receiving, at the demultiplexing face thereof, the flux of light emitted from the linearly polarized element, and a light modulation section for receiving the flux of light emitted from the demultiplexing face of the polarizing beam splitter, changing the polarization direction of the received flux of light in accordance with an image signal and reflecting the flux of light so as to be introduced back to the demultiplexing face of the polarizing beam splitter, the linearly polarizing element being disposed in such a manner as to extend perpendicularly to a reference plane which includes a normal to the demultiplexing face and the optical axis and be inclined at an acute angle in the opposite direction to the demultiplexing face with respect to the plane perpendicular to the optical axis.

A flux of light is introduced into the projection type image display apparatus. In the projection type image display apparatus, the linearly polarizing element in the form of a flat plate is provided in front of the polarizing beam splitter whose polarizing face is inclined to the predetermined angle with respect to a plane perpendicular to the optical axis. Further, in the projection type image display apparatus, the linearly polarizing element is disposed perpendicularly to the reference plane in which the normal to the multiplexing face and the optical axis are included and is inclined at an acute angle in the opposite direction to the multiplexing face with respect to the plane perpendicular to the optical axis.

According to another aspect of the present invention, there is provided a projection type image display apparatus, including a linearly polarizing element in the form of a flat plate for emitting light polarized in one direction from within a flux of light incident along an optical axis, a wavelength plate for receiving the flux of light emitted from the linearly polarizing element and shifting the polarization direction of the received flux of light, a polarizing beam splitter disposed in an inclined relationship to a predetermined angle with respect to a plane perpendicular to the optical axis and having a demultiplexing face which passes S or P polarized light therethrough but reflects polarized light having a polarization direction perpendicular to that of the polarized light which passes through the demultiplexing face, the polarizing beam splitter receiving, at the demultiplexing face thereof, the flux of light emitted from the linearly polarized element, and a light modulation section for receiving the flux of light emitted from the demultiplexing face of the polarizing beam splitter, changing the polarization direction of the received flux of light in accordance with an image signal and reflecting the flux of light so as to be introduced back to the demultiplexing face of the polarizing beam splitter, the linearly polarizing element and/or the wavelength plate being disposed in such a manner as to extend perpendicularly to a reference plane which includes a normal to the demultiplexing face and the optical axis and be inclined at an acute angle in the opposite direction to the demultiplexing face with respect to the plane perpendicular to the optical axis.

A flux of light is introduced into the projection type image display apparatus. In the projection type image display apparatus, the linearly polarizing element in the form of a flat plate and the wavelength plate are provided in front of the polarizing beam splitter whose polarizing face is inclined to the predetermined angle with respect to a plane perpendicular to the optical axis. Further, in the projection type image display apparatus, both or one the linearly polarizing element and the wavelength plate is disposed perpendicularly to the reference plane in which the normal to the multiplexing face and the optical axis are included and is inclined at an acute angle in the opposite direction to the multiplexing face with respect to the plane perpendicular to the optical axis.

With both of the projection type image display apparatus, the polarized light demultiplexing characteristic can be enhanced with a simple configuration, and an image of a high quality having a high contrast can be projected.

According to a further aspect of the present invention, there is provided an optical system, including a linearly polarizing element in the form of a flat plate for emitting light polarized in one direction from within a flux of light incident along an optical axis, and a polarizing beam splitter disposed in an inclined relationship to a predetermined angle with respect to a plane perpendicular to the optical axis and having a demultiplexing face which passes S or P polarized light therethrough but reflects polarized light having a polarization direction perpendicular to that of the polarized light which passes through the demultiplexing face, the polarizing beam splitter receiving, at the demultiplexing face thereof, the flux of light emitted from the linearly polarized element, the linearly polarizing element being disposed in such a manner as to extend perpendicularly to a reference plane which includes a normal to the demultiplexing face and the optical axis and be inclined at an acute angle in the opposite direction to the demultiplexing face with respect to the plane perpendicular to the optical axis.

A flux of light is introduced into the optical system. In the optical system, the linearly polarizing element in the form of a flat plate is provided in front of the polarizing beam splitter whose polarizing face is inclined to the predetermined angle with respect to a plane perpendicular to the optical axis. Further, in the optical system, the linearly polarizing element is disposed perpendicularly to the reference plane in which the normal to the multiplexing face and the optical axis are included and is inclined at an acute angle in the opposite direction to the multiplexing face with respect to the plane perpendicular to the optical axis.

According to a still further aspect of the present invention, there is provided an optical system, including a linearly polarizing element in the form of a flat plate for emitting light polarized in one direction from within a flux of light incident along an optical axis, a wavelength plate for receiving the flux of light emitted from the linearly polarizing element and shifting the polarization direction of the received flux of light, and a polarizing beam splitter disposed in an inclined relationship to a predetermined angle with respect to a plane perpendicular to the optical axis and having a demultiplexing face which passes S or P polarized light therethrough but reflects polarized light having a polarization direction perpendicular to that of the polarized light which passes through the demultiplexing face, the polarizing beam splitter receiving, at the demultiplexing face thereof, the flux of light emitted from the linearly polarized element, the linearly polarizing element and/or the wavelength plate being disposed in such a manner as to extend perpendicularly to a reference plane which includes a normal to the demultiplexing face and the optical axis and be inclined at an acute angle in the opposite direction to the demultiplexing face with respect to the plane perpendicular to the optical axis.

A flux of light is introduced into the optical system. In the optical system, the linearly polarizing element in the form of a flat plate and the wavelength plate are provided in front of the polarizing beam splitter whose polarizing face is inclined to the predetermined angle with respect to a plane perpendicular to the optical axis. Further, in the optical system, both or one of the linearly polarizing element and the wavelength plate is disposed perpendicularly to the reference plane in which the normal to the multiplexing face and the optical axis are included and is inclined at an acute angle in the opposite direction to the multiplexing face with respect to the plane perpendicular to the optical axis.

With both of the optical systems, the polarized light demultiplexing characteristic can be enhanced with a simple configuration.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 9 is an enlarged view of part of the relationship of FIG. 8;

FIGS. 10A to 10D are graphs illustrating a contrast with respect to the inclination angle x where the refractive index of the linearly polarizing element is 1, the refractive index of the polarizing beam splitter is 1.4 and the cone angle is 8, 12, 16 and 20 degrees, respectively;

FIGS. 11A to 11D are graphs illustrating a contrast with respect to the inclination angle x where the refractive index of the linearly polarizing element is 2, the refractive index of the polarizing beam splitter is 1.4 and the cone angle is 8, 12, 16 and 20 degrees, respectively;

FIGS. 13A to 13D are graphs illustrating a contrast with respect to the inclination angle x where the refractive index of the linearly polarizing element is 2, the refractive index of the polarizing beam splitter is 2 and the cone angle is 8, 12, 16 and 20 degrees, respectively;

FIG. 17 is a schematic view showing a modification to the reflection type liquid crystal projector which includes a linearly polarizing element and a half-wave plate and wherein the half-wave plate is inclined;

FIG. 18 is a schematic view showing another modification to the reflection type liquid crystal projector which includes a linearly polarizing element and a half-wave plate and wherein both of the linearly polarizing element and the half-wave plate are inclined;

FIG. 21 is a schematic view of a modified optical system wherein a linearly polarizing element is used commonly for G and B components.

DESCRIPTION OF THE PREFERRED EMBODIMENT

Figure 1:
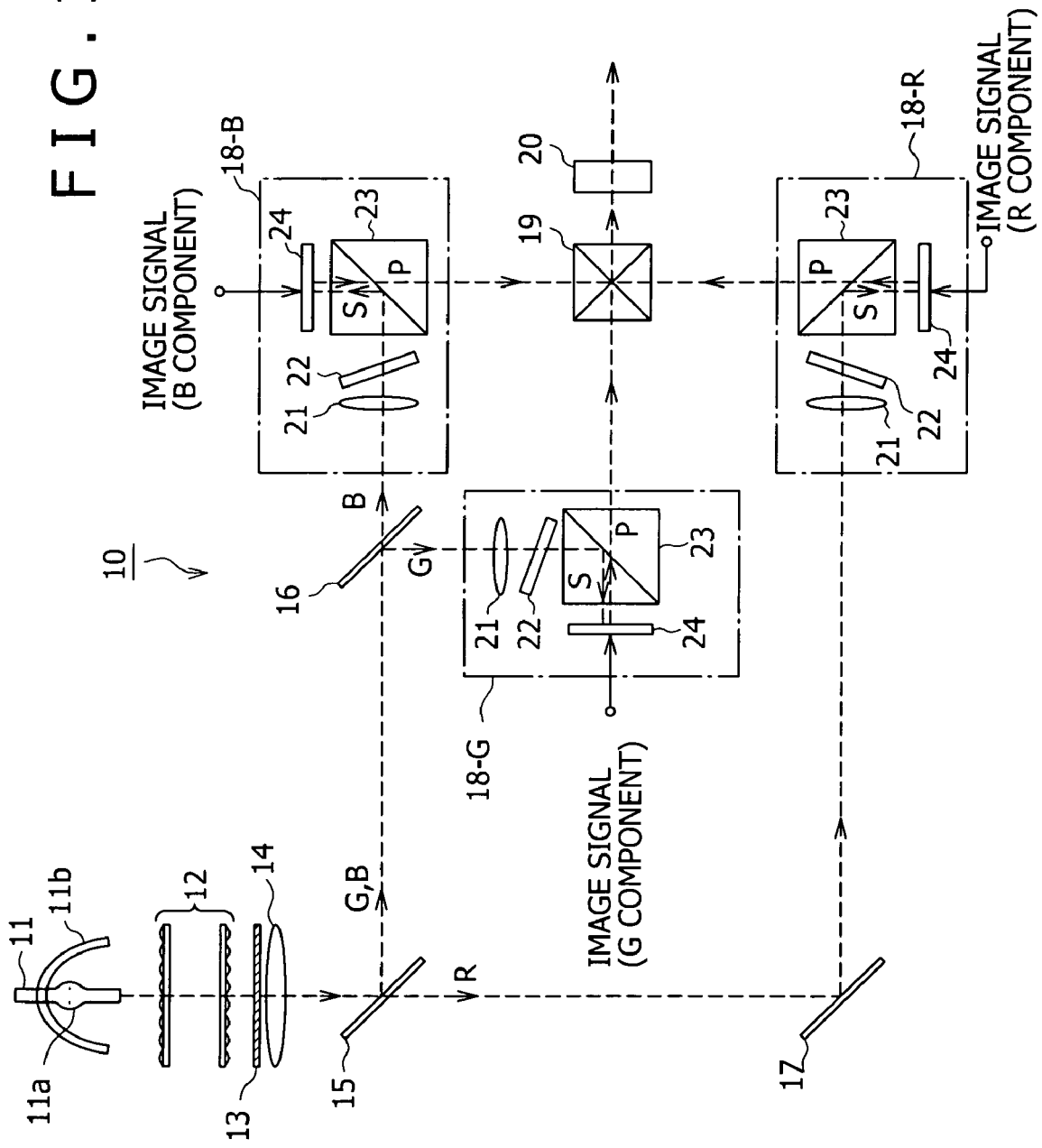
FIG. 1 is a schematic view showing a configuration of an optical system of a reflection type liquid crystal projector to which the present invention is applied.

Referring to FIG. 1, there is shown a reflection type image display apparatus to which the present invention is applied. The reflection type image display apparatus includes a reflection type liquid crystal element and is generally denoted by 10. It is to be noted that the reflection type image display apparatus 10 is hereinafter referred to simply as reflection type projector 10.

The reflection type projector 10 includes a lamp 11, a pair of integrator lenses 12, a P-S conversion element 13, a condenser lens 14, a first dichroic mirror 15, a second dichroic mirror 16, and a mirror 17. The reflection type projector 10 further includes a red (R) light polarizing optical system 18-R, a green (G) light polarizing optical system 18-G and a blue (B) light polarizing optical system 18-B, a color synthesis prism 19, and a projection lens 20.

The lamp 11 is an illumination light source of white light and may be, for example, a halogen lamp, a xenon lamp, a metal halide lamp, an ultra-high pressure mercury lamp or the like. In order to emit a flux of light from a light source 11a efficiently, a reflector 11b having an ellipsoidal or paraboloidal shape is disposed on the rear side of a light path of the lamp 11. A flux of light of white light emitted from the lamp 11 enters a pair of integrator lenses 12.

The integrator lenses 12 uniform the spatial distribution of the incident light flux from the lamp 11. The light flux having passed through the integrator lenses 12 enters the P-S conversion element 13.

The P-S conversion element 13 converts the light having passed through the integrator lenses 12 into light polarized in one direction. The light flux having passed through the P-S conversion element 13 passes through the condenser lens 14 and enters the first dichroic mirror 15.

The first dichroic mirror 15 passes light (R) in the red wavelength band therethrough but reflects light (G and B) in the blue and green wavelength bands. The reflected light (G and B) in the green and blue wavelength bands enters the second dichroic mirror 16. The second dichroic mirror 16 reflects the light (G) in the green wavelength band, but passes the light (B) in the blue wavelength band therethrough.

The light in the red wavelength band having passed through the first dichroic mirror 15 is reflected by the mirror 17 and enters the R light polarizing optical system 18-R. The light in the green wavelength band reflected by the second dichroic mirror 16 enters the G light polarizing optical system 18-G. The light in the blue wavelength band having passed through the second dichroic mirror 16 enters the B light polarizing optical system 18-B.

A red (R) signal from within an image signal is inputted to the R light polarizing optical system 18-R. The R light polarizing optical system 18-R spatially modulates the incident light in the red wavelength band with the R signal to emit a flux of light which forms an image corresponding to an R component of an image to be formed.

A green (G) signal from within the image signal is inputted to the G light polarizing optical system 18-G. The G light polarizing optical system 18-G spatially modulates the incident light in the green wavelength band with the G signal to emit a flux of light which forms an image corresponding to a G component of the image to be formed.

A blue (B) signal from within the image signal is inputted to the B light polarizing optical system 18-B. The B light polarizing optical system 18-B spatially modulates the incident light in the blue wavelength band with the B signal to emit a flux of light which forms an image corresponding to a B component of the image to be formed.

The lights emitted from the R light polarizing optical system 18-R, G light polarizing optical system 18-G and B light polarizing optical system 18-B are all introduced into the color synthesis prism 19. The color synthesis prism 19 synthesizes the light of the red component, the light of the green component and the light of the blue component into a single flux of light and emits the synthesized light flux.

The multiplexed light emitted from the color synthesis prism 19 enters the projection lens 20. The projection lens 20 projects the incident synthesized light in an expanded scale on a screen not shown to form an image on the screen.

Now, an internal configuration of the R light polarizing optical system 18-R, G light polarizing optical system 18-G and B light polarizing optical system 18-B is described. It is to be noted that all of the R light polarizing optical system 18-R, G light polarizing optical system 18-G and B light polarizing optical system 18-B have the same configuration. In the following description, where there is no necessity to distinguish them from each other, any of them is referred to as polarizing optical system 18.

The polarizing optical system 18 includes a field lens 21, a linearly polarizing element 22, a polarizing beam splitter 23, and a reflection type image modulation element 24.

The field lens 21 receives a light flux in the red, green or blue wavelength band demultiplexed by the first dichroic mirror 15 and the second dichroic mirror 16. The field lens 21 converts the incident light flux into a divergent light flux and illuminates the divergent light flux on the linearly polarizing element 22.

The linearly polarizing element 22 is an element in the form of a flat plate and emits light polarized in one direction from within the incident light flux. The linearly polarizing element 22 passes light polarized in a certain one direction therethrough but blocks any other polarized light. For the linearly polarizing element 22, a polarizer of the reflection type such as a wire grid or a polarizer of the absorption type which passes light polarized in a certain one direction therethrough but absorbs any other polarized light is used. Further, as the polarizer of the reflection type, for example, a wire grid polarizer which has been put into practical use by MOXTEK, Inc. or a like element may be used.

The light polarized in the one direction and having passed through the linearly polarizing element 22 enters the polarizing beam splitter 23. The polarizing beam splitter 23 has a light demultiplexing face 23a which reflects S polarized light but passes P polarized light therethrough. The light demultiplexing face 23a of the polarizing beam splitter 23 is arranged such that the polarized light emitted from the linearly polarizing element 22 may be S polarized light.

It is to be noted that an arrangement relationship between the linearly polarizing element 22 and the polarizing beam splitter 23 is hereinafter described in detail.

The reflection type image modulation element 24 is formed, for example, from a liquid crystal element of the reflection type. The reflection type image modulation element 24 receives the S polarized light reflected by the polarizing beam splitter 23. Further, a color signal (R signal, G signal or B signal of the image signal) is inputted to the reflection type image modulation element 24, and the reflection type image modulation element 24 spatially modulates the S polarized light in accordance with the color signal inputted thereto. As a result of the spatial modulation of the incident light (S polarized light) in accordance with the image signal, at a bright portion (white portion) of the image, the light of the S polarization is converted into P polarized light and reflected by the reflection type image modulation element 24, but at a dark portion (black portion) of the image, the light of the S polarization is reflected by the reflection type image modulation element 24 while keeping the S polarization. The light reflected from the reflection type image modulation element 24 enters the polarizing beam splitter 23 again. The polarizing beam splitter 23 passes the P polarized light component from within the incident light therethrough while it reflects the S polarized light component.

Then, the polarizing optical system 18 emits the light (P polarized light), which has passed through the polarizing beam splitter 23 after reflected by the reflection type image modulation element 24, toward the color synthesis prism 19.

As described above, in the polarizing optical system 18, the reflection type image modulation element 24 converts, at a bright portion (white portion) of an image, incident light (S polarized light) into P polarized light and reflects the P polarized light. The P polarized light enters the polarizing beam splitter 23 again and passes as it is through the polarizing beam splitter 23, whereafter it passes through the color synthesis prism 19 and the projection lens 20 and forms an image on the screen. On the other hand, at a dark portion (black portion) of the image, the reflection type image modulation element 24 introduces incident light (S polarized light) as S polarized light back into the polarizing beam splitter 23, by which the light is reflected so that it returns to the original light path.

Accordingly, an image on which bright and dark portions are formed in accordance with the image signal is formed on emerging light from the polarizing optical system 18. In particular, light of a red component image of the image signal emerges from the R light polarizing optical system 18-R; light of a green component image of the image signal emerges from the G light polarizing optical system 18-G; and light of a blue component image of the image signal emerges from the B light polarizing optical system 18-B. Therefore, an image of light in accordance with the image signal is projected on the screen.

Figure 2:
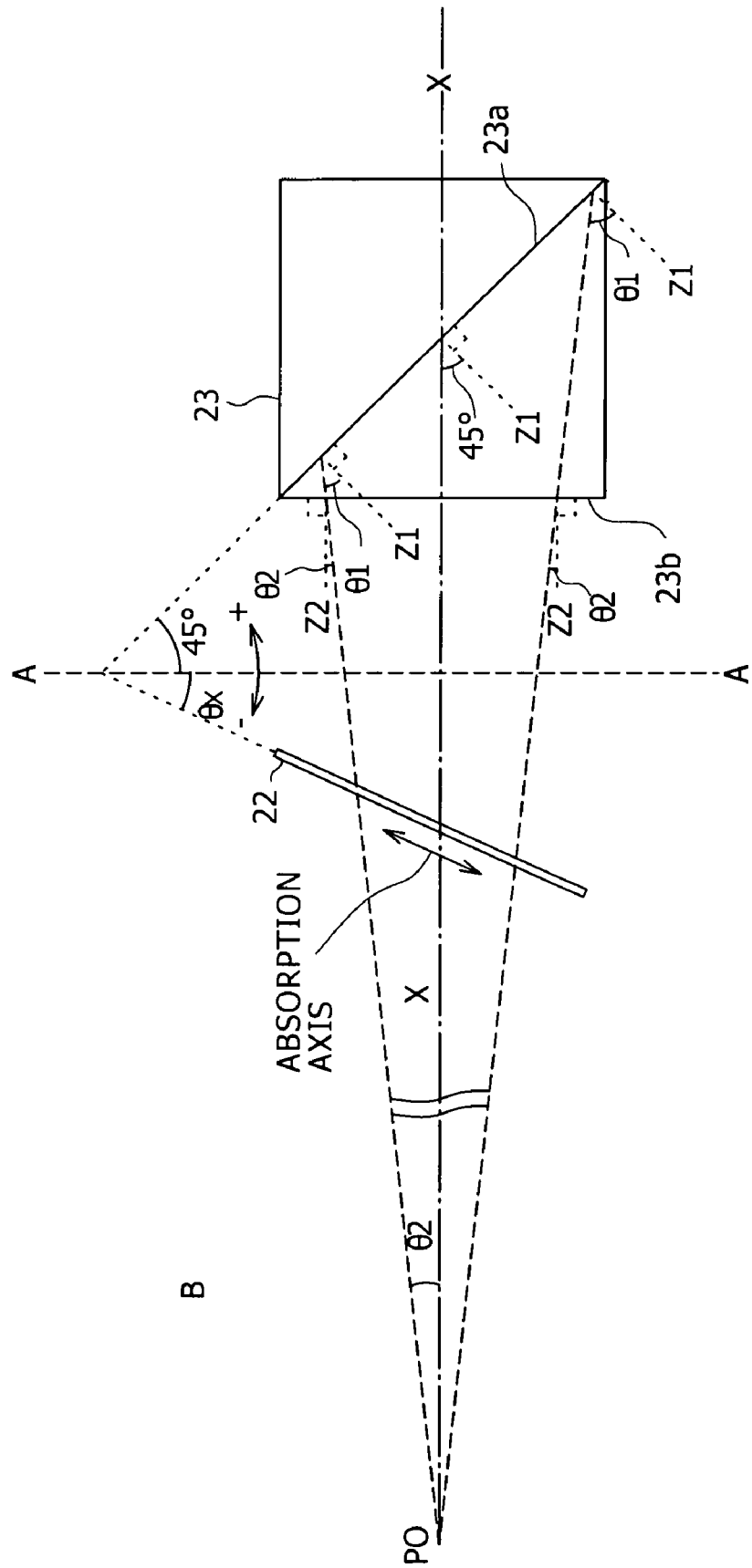
FIG. 2 is a diagrammatic view illustrating an arrangement relationship between a polarizing beam splitter and a linearly polarizing element.

Arrangement Relationship Between the Linearly Polarizing Element and the Polarizing Beam Splitter Now, an arrangement relationship between the linearly polarizing element 22 and the polarizing beam splitter 23 is described in detail with reference to FIG. 2.

The linearly polarizing element 22 and the polarizing beam splitter 23 are disposed in order of the linearly polarizing element 22→polarizing beam splitter 23 on the light path of an incident flux of light. Not a parallel light flux but a divergent light flux is introduced into the linearly polarizing element 22 and the polarizing beam splitter 23. The divergent light flux is a flux of light whose width increases as the flux of light advances. The polar angle of the incident divergent light flux is hereinafter referred to as cone angle $\theta_2$.

The polarizing beam splitter 23 has the light demodulating inclined face 23a in the form of a flat face formed in the inside thereof, and light is introduced into the polarizing beam splitter 23 through an arbitrary surface (incidence face 23b) of the polarizing beam splitter 23 which is not perpendicular to the light demultiplexing face 23a.

The incidence face 23b to which the divergent light flux is introduced has a form of a flat face. The polarizing beam splitter 23 is disposed such that the incidence face 23b thereof may be perpendicular to the optical axis X. The divergent light flux incoming through the incidence face 23b passes through the inside of the polarizing beam splitter 23 until it comes to the light demultiplexing face 23a.

The light demultiplexing face 23a is inclined to an angle of 45° with respect to an plane A perpendicular to the optical axis X of the divergent light flux. In other words, a normal $Z_1$ to the light demultiplexing face 23a is inclined to an angle of 45° with respect to the optical axis X of the incident divergent light flux. It is to be noted that the inclination angle may not necessarily be 45°.

Further, the light demultiplexing face 23a is disposed such that it totally reflects the light polarized in the one direction and having passed through the linearly polarizing element 22. In particular, the arrangement relationship between the linearly polarizing element 22 and the polarizing beam splitter 23 is such that the light polarized in the one direction and having passed through the linearly polarizing element 22 may be S polarized light. In other words, the linearly polarizing element 22 has an absorption axis whose direction is set so that the light passing through the linearly polarizing element 22 is introduced as S polarized light to the light demultiplexing face 23a.

The linearly polarizing element 22 is formed as a flat plate.

The linearly polarizing element 22 in the form of a flat plate is disposed such that, where a plane defined by the normal $Z_1$ to the light demultiplexing face 23a and the optical axis X is set as a reference plane B, the plane of the linearly polarizing element 22 may be perpendicular to the reference plane B.

Further, the linearly polarizing element 22 in the form of a flat plate is inclined at an acute angle in the opposite direction (minus direction) to the light demultiplexing face 23a with respect to the plane A perpendicular to the optical axis X. In other words, the angle defined by the linearly polarizing element 22 and the plane A on the reference plane B is an acute angle (not 0 degree nor 90 degrees), and besides, where the direction of rotation of the angle of the light demultiplexing face 23a with respect to the plane A is set as a plus direction, the direction of rotation of the angle of the linearly polarizing element 22 with respect to the plane A is a minus direction. The angle of the linearly polarizing element 22 in the form of a flat plate with respect to the plane A perpendicular to the optical axis X is hereinafter referred to as inclination angle $\theta x$.

Effects by the Arrangement Relationship of the Linearly Polarizing Element and the Polarizing Beam Splitter Where the arrangement relationship of the linearly polarizing element 22 and the polarizing beam splitter 23 is set in such a manner as described above, the contrast which is a ratio in brightness between a bright portion (white portion) and a dark portion (black portion) of light emitted from the polarizing optical system 18 is enhanced. In other words, the ratio of S polarized light illuminated from the linearly polarizing element 22 on the light demultiplexing face 23a of the polarizing beam splitter 23 increases, that is, the ratio of P polarized light decreases.

A reason is described below.

The reason why the linearly polarizing element 22 is inserted is that it is intended to remove a component whose polarization has not been converted by the P-S conversion element 13 while only a particular polarized light component (in the present embodiment, the S polarized light component) is introduced into the polarizing beam splitter 23.

The light incident to the polarizing beam splitter 23 is a divergent light flux. The divergent light flux enters, after it passes through the linearly polarizing element 22, at an angle equal to the cone angle $\theta_2$ to the incidence face 23b (face perpendicular to the optical axis) of the polarizing beam splitter 23, and is refracted by the incidence face 23b. The divergent light beam refracted by the incidence face 23b passes through the inside of the polarizing beam splitter 23 until it arrives at the light demultiplexing face 23a.

Figure 3:
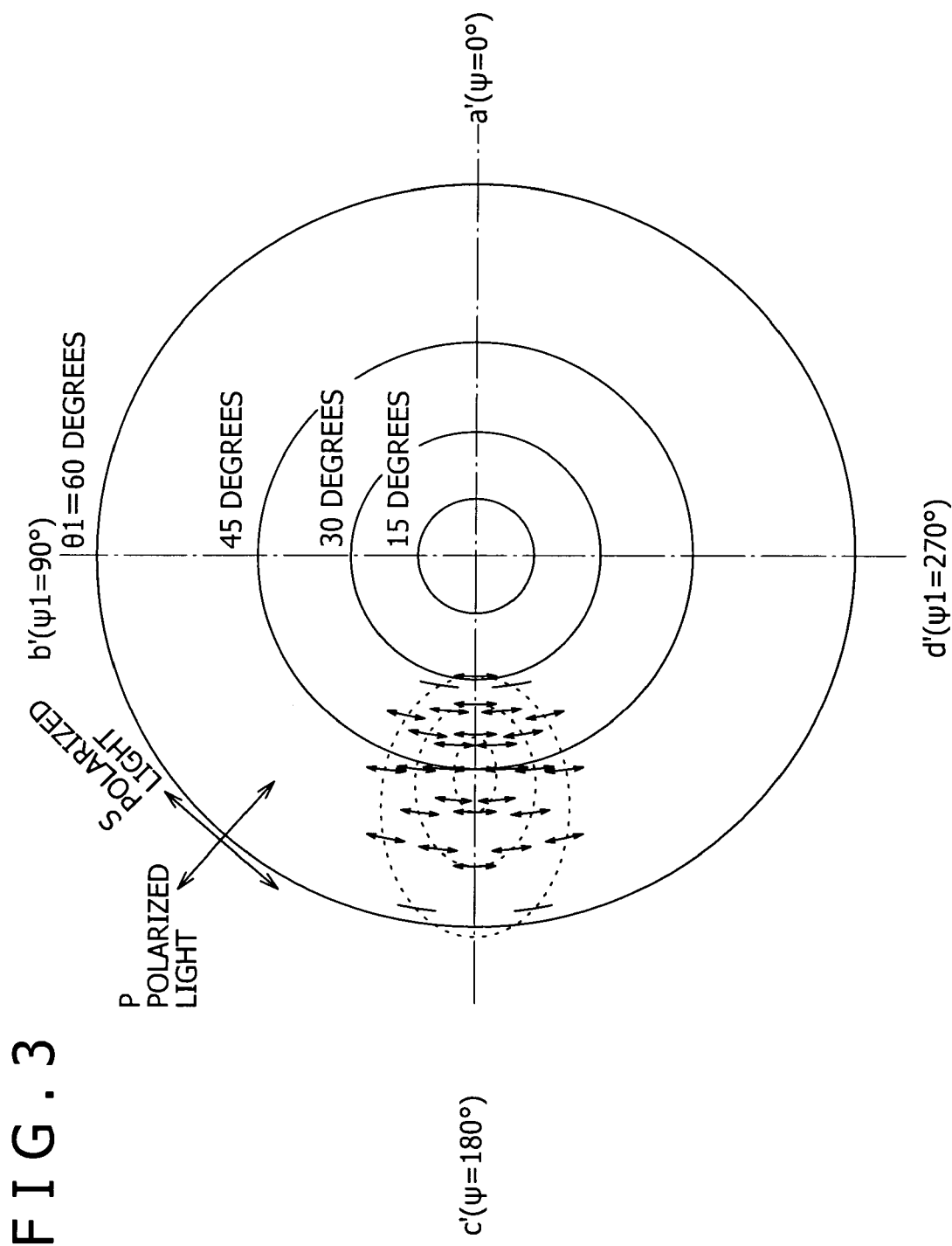
FIG. 3 is a diagrammatic view illustrating a relationship between the angle of incidence to a light demodulating inclined face and a polarization condition on the light demodulating inclined face where the inclination angle θx=0 degree.
Figure 4:
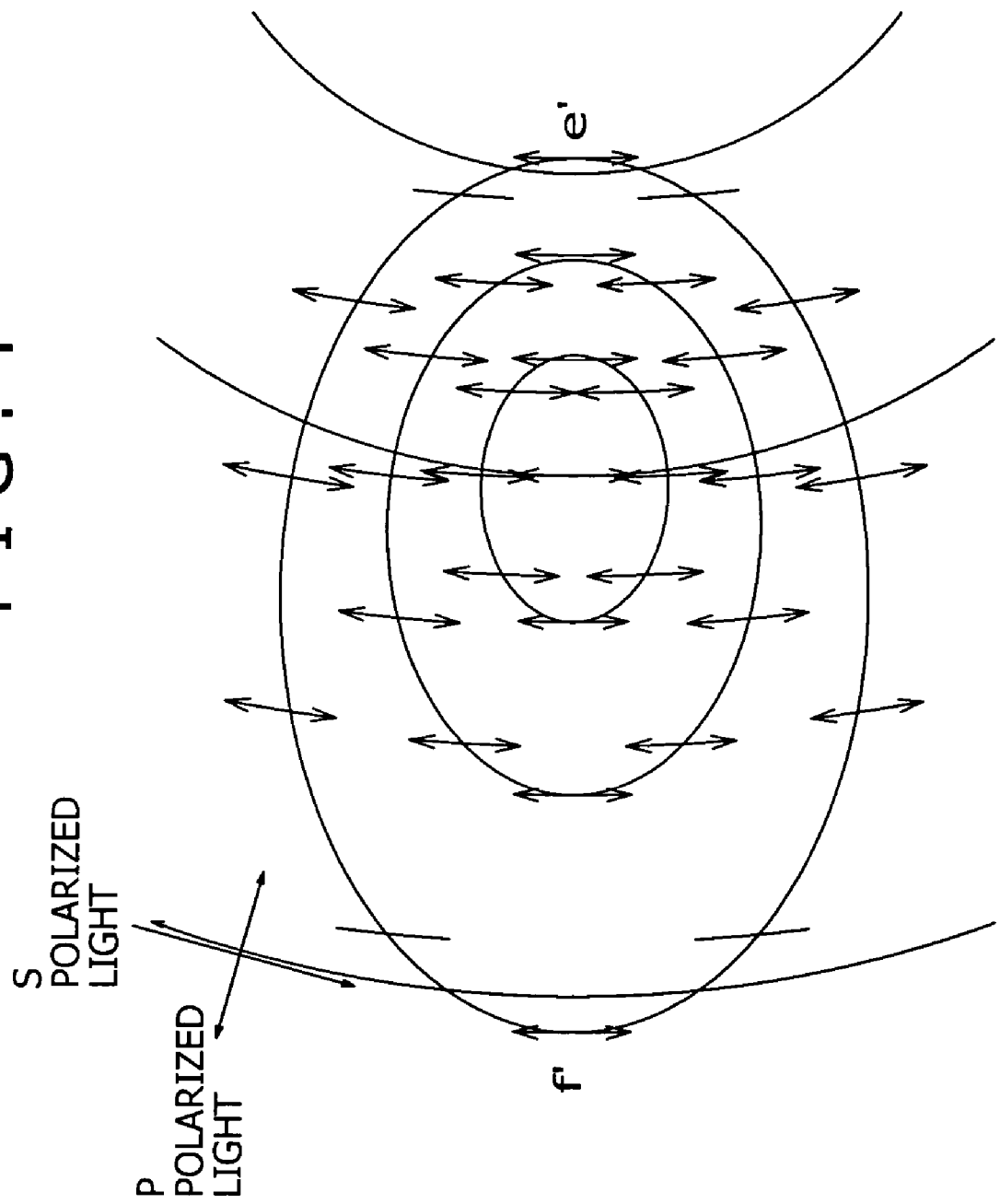
FIG. 4 is an enlarged view of part of the relationship of FIG. 3.

Here, a relationship between the angle of incidence to the light demultiplexing face 23a and the polarization condition on the light demultiplexing face 23a where the linearly polarizing element 22 extends perpendicularly to the optical axis X (that is, the inclination angle $\theta x=0$) is illustrated in FIGS. 3 and 4. FIG. 4 illustrates part of the relationship of FIG. 3 in an enlarged scale. It is to be noted that the refractive index of the polarizing beam splitter 23 is 1.86 and the linearly polarizing element 22 exists within a medium whose refractive index is 1.2.

Figure 5:
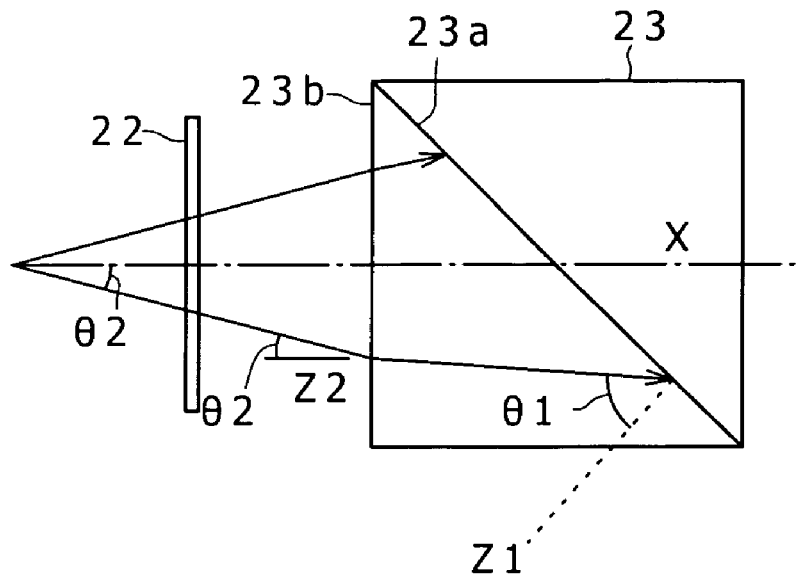
FIG. 5 is a diagrammatic view illustrating a polar angle with respect to the light demultiplexing inclined face.

Concentric circles each drawn in a solid line in FIGS. 3 and 4 represent incident angle distributions of the incoming light ray on the light demultiplexing face 23a. In particular, each circle drawn in a solid line represents the polar angle $\theta_1$ with respect to a normal $Z_1$ to the light demultiplexing face 23a of the polarizing beam splitter 23 as shown in FIG. 5. In FIG. 3, circles corresponding to the angles of incidence of $\theta_1=15, 30, 45$ and 60 degrees are shown.

Figure 6:
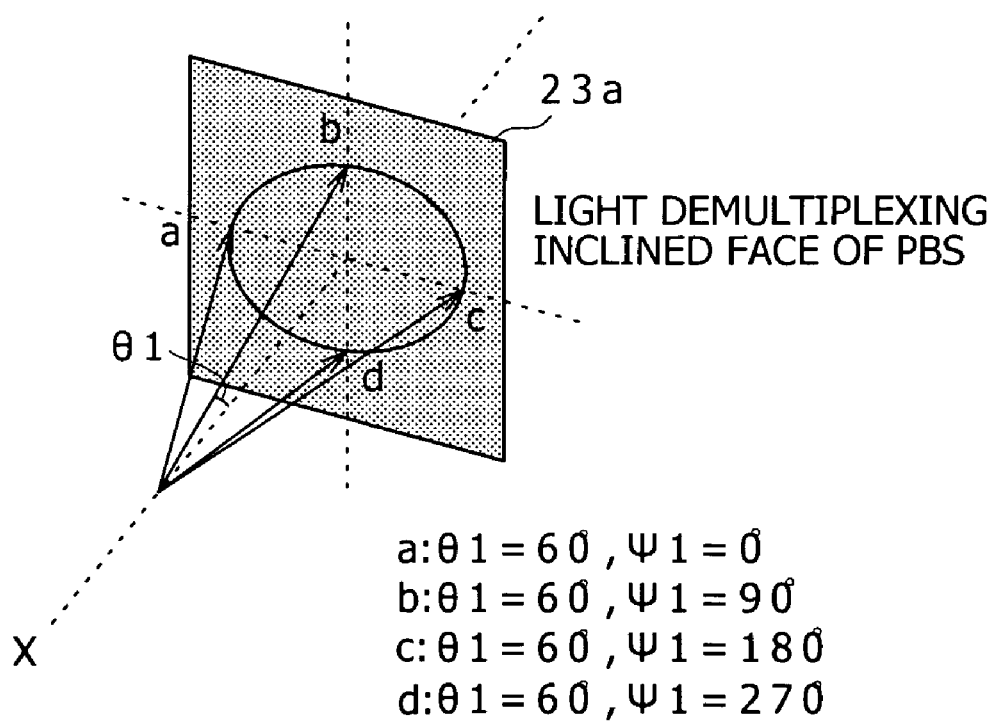
FIG. 6 is a schematic view illustrating an azimuth angle of incidence with respect to the light demultiplexing inclined face.

The circumference of each of the concentric circles drawn by solid lines in FIGS. 3 and 4 represents an azimuth angle $\psi_1$ of the incident light ray to the light demultiplexing face 23a. For example, the incident angles of arrow marks a ($\psi_1=0$ degree), b ($\psi_1=90$ degrees), c ($\psi_1=180$ degrees) and d ($\psi_1=270$ degrees) representative of such rays of light which advance in four directions of different azimuth angles as shown in FIG. 6 are represented as points a', b', c' and d' in FIG. 3, respectively.

A plurality of ellipses drawn in broken lines in FIGS. 3 and 4 represent incident angle distributions of the incoming light ray to the incidence face 23b. In short, each of the ellipses drawn in broken lines represents the polar angle $\theta_2$ with respect to a normal $Z_2$ to the incidence face 23b of the polarizing beam splitter 23 as shown in FIG. 5. In FIGS. 3 and 4, ellipses corresponding to the incident angles of $\theta_2=10, 20$ and 30 degrees are drawn.

Figure 7:
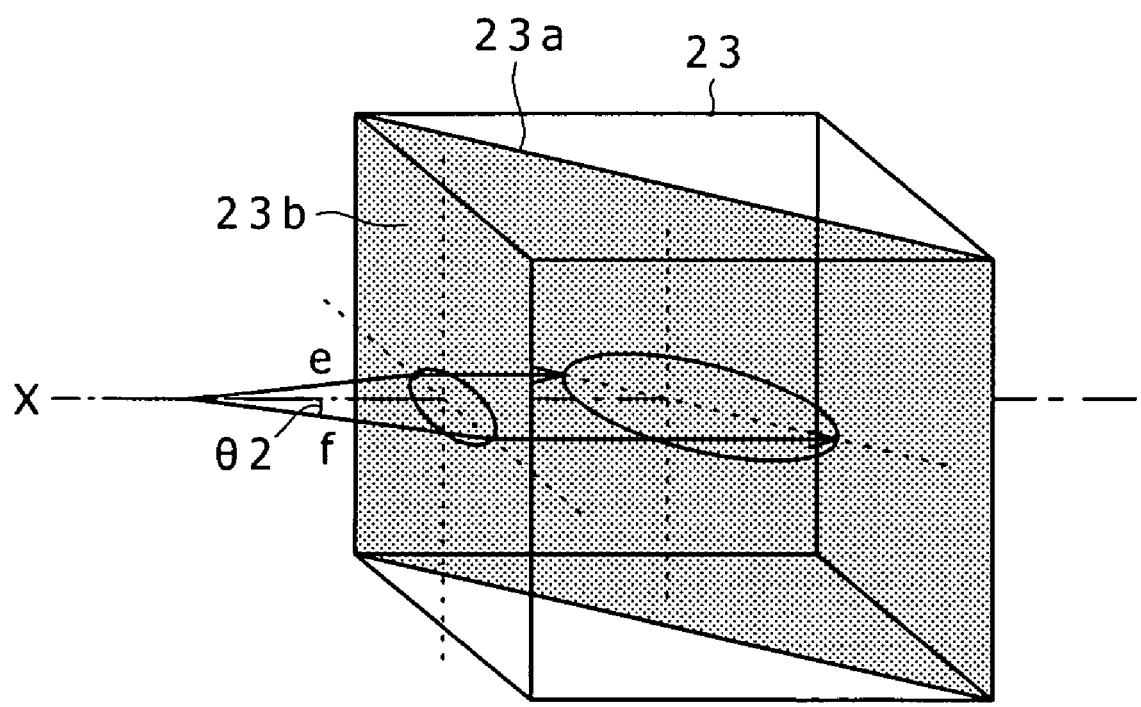
FIG. 7 is a schematic view illustrating an azimuth angle with respect to an incidence face.

The circumference of each of the concentric circles drawn by broken lines in FIGS. 3 and 4 represents an azimuth angle $\psi_2$ of the incident light ray to the incidence face 23b. For example, the incident angles of arrow marks e ($\theta_2$=30 degrees, $\psi_2$=0 degree) and f ($\theta_2$=30 degrees, $\psi_2$=180 degrees) representative of such rays of light which advance in two directions of different azimuth angles as shown in FIG. 7 are represented as points e' and f' on the ellipses in FIG. 4.

In this manner, at which polar angle $\theta_1$ and azimuth angle $\psi_1$ a light ray incident at the polar angle $\theta_2$ and the azimuth angle $\psi_2$ to the incidence face 23b strikes the light demultiplexing face 23a can be discriminated from the positional relationship between the concentric lines (solid lines) and the ellipses (broken lines) of FIGS. 3 and 4. As an example, a light ray ($\theta_2$=30 degrees, $\psi_2$=180 degrees) incident to the incidence face 23b strikes the light demultiplexing face 23a at the polar angle $\theta_1$=60.6 degrees and the azimuth angle $\psi_1$=180 degrees.

Incidentally, the concentric circles of solid lines represent the polar angles $\theta_1$ and azimuth angles $\psi_1$ on the light demultiplexing face 23a. From this, the tangential direction to each of the concentric circles of solid lines represents an S wave component on the light demultiplexing face 23a while the perpendicular direction represents a P wave component on the light demultiplexing face 23a.

Further, double-sided arrow marks are indicated on the ellipses of FIGS. 3 and 4. Each of the double-sided arrow marks represents the direction of the polarization axis on the light demultiplexing face 23a when a light ray strikes the incidence face 23b of the polarizing beam splitter 23 at the angles $\theta_2$ and $\psi_2$ represented by a point on the ellipse.

From the double-sided arrow marks in FIGS. 3 and 4, it can be seen that light rays striking the incidence face 23b of the polarizing beam splitter 23 at the azimuth angle $\psi_2$=0 degree and 180 degrees exhibit coincidence between the polarization axis and the tangential direction to the concentric circles. However, the other light rays do not exhibit coincidence with the tangential direction.

Polarized light in the perpendicular direction to each concentric circle can pass, at most part thereof, the light demultiplexing face 23a because it strikes the light demultiplexing face 23a as a P wave component. However, as far as the demultiplexing characteristic of the polarizing beam splitter 23 is not ideal, part of the polarized light is reflected by the light demultiplexing face 23a and introduced to the image modulation element 24. The light flux of the P polarized light is displayed on the screen when the black is to be displayed.

Therefore, where there are many components having polarization directions which do not coincide with the tangential directions to the concentric circles as seen in FIGS. 3 and 4, they deteriorate the contrast of the projected image and make a cause of deterioration of the quality of the image.

Figure 8:
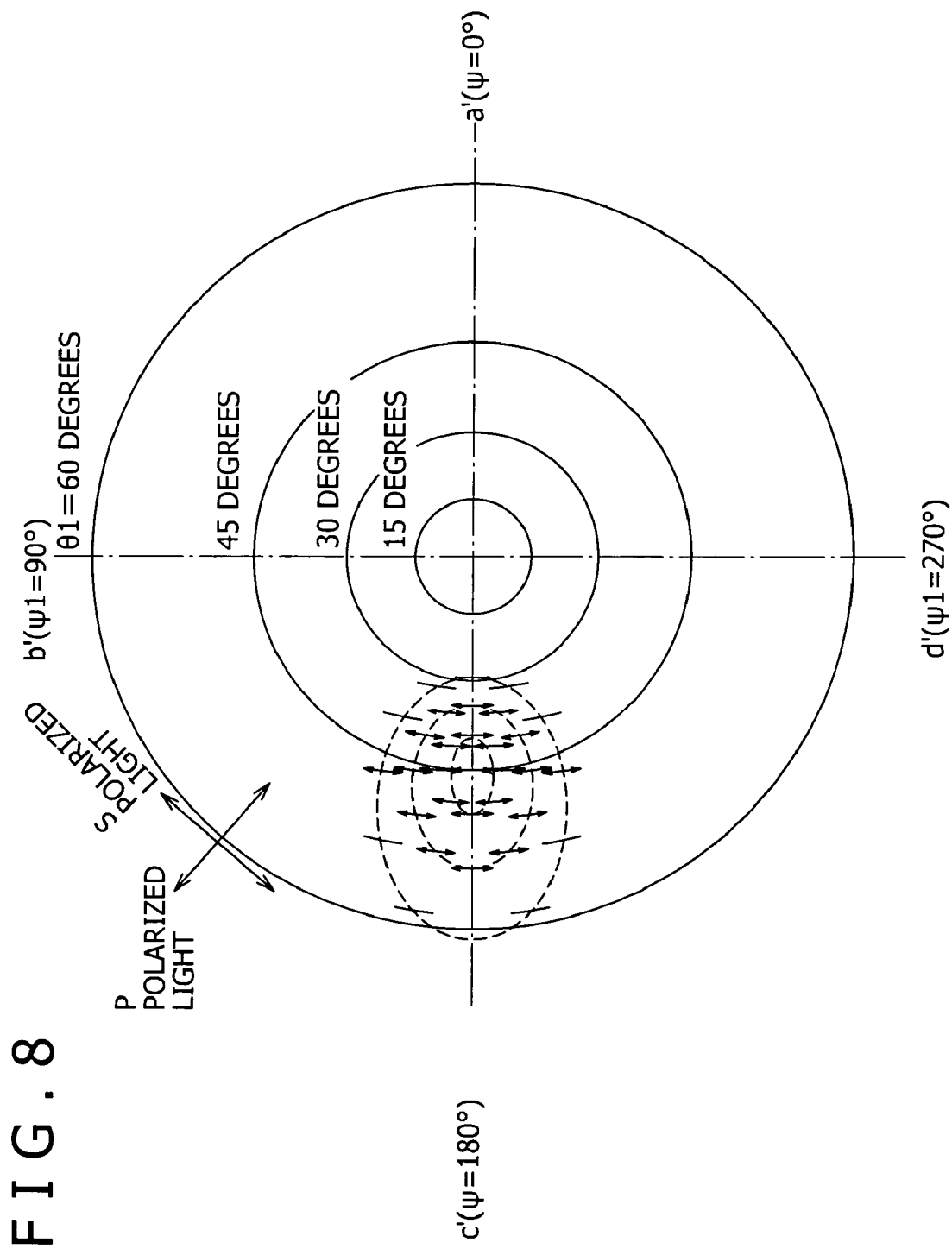
FIG. 8 is a diagrammatic view illustrating a relationship between the angle of incidence to the light demodulating inclined face and a polarization condition on the light demodulating inclined face where the inclination angle θx=21 degrees.
Figure 12A:
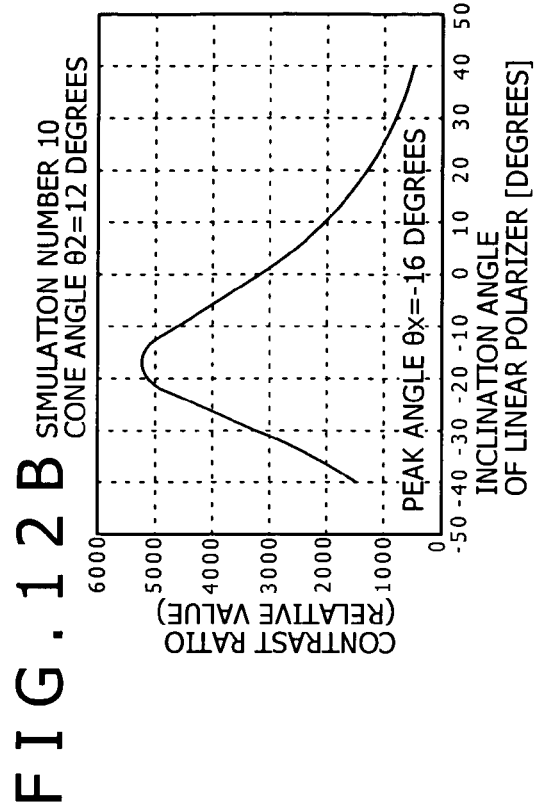
FIGS. 12A to 12D are graphs illustrating a contrast with respect to the inclination angle x where the refractive index of the linearly polarizing element is 1, the refractive index of the polarizing beam splitter is 2 and the cone angle is 8, 12, 16 and 20 degrees, respectively.
Figure 12B:
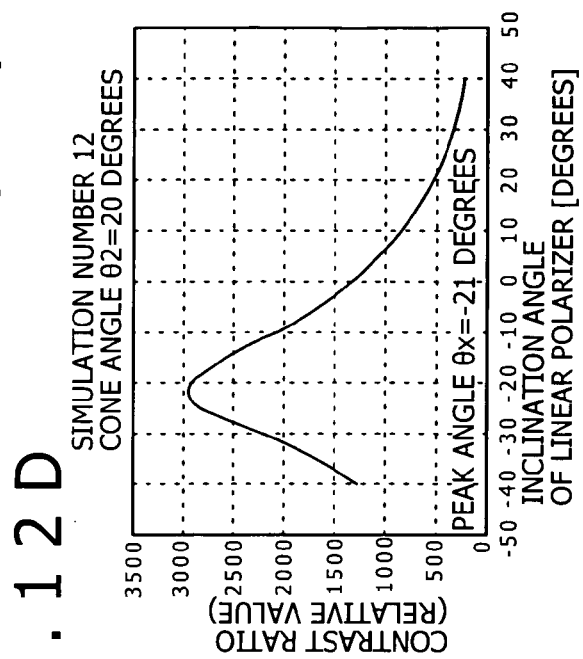
Figure 12C:
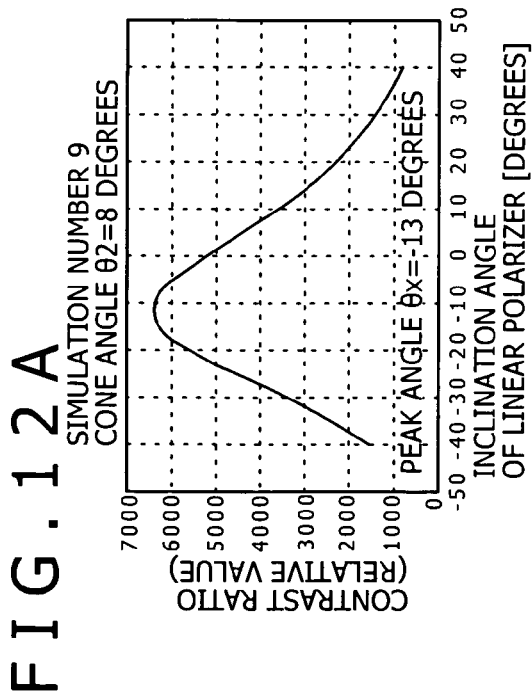
Figure 12D:
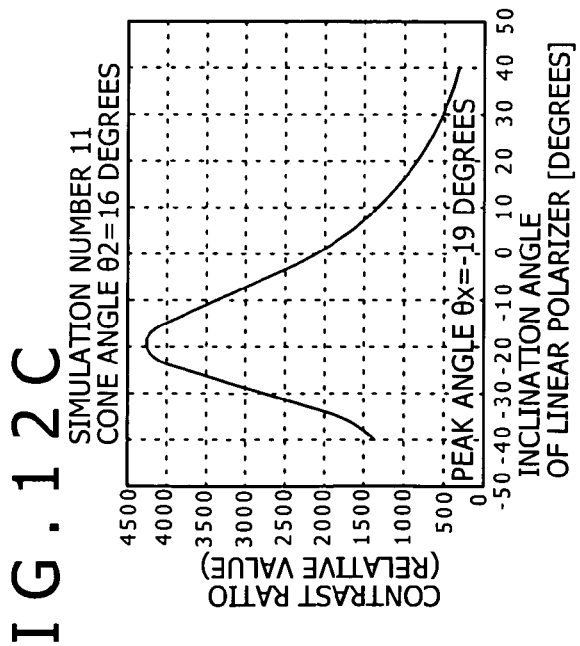
Figure 14A:
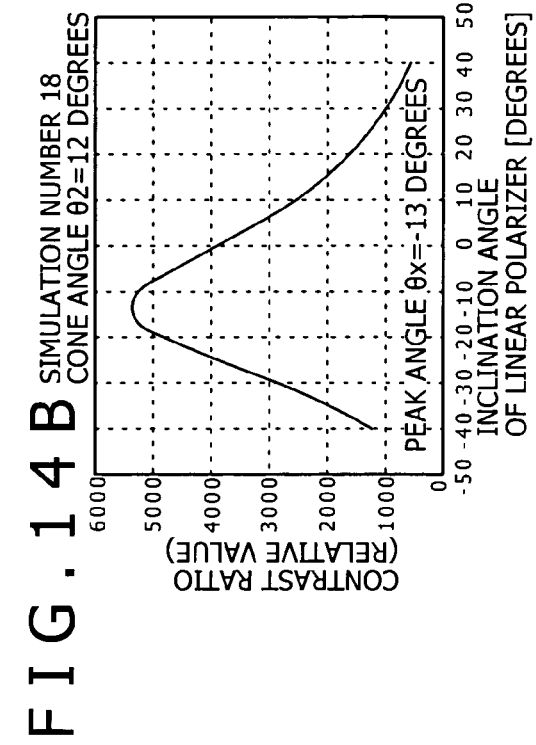
FIGS. 14A to 14D are graphs illustrating a contrast with respect to the inclination angle x where the refractive index of the linearly polarizing element is 1, the refractive index of the polarizing beam splitter is 2.4 and the cone angle is 8, 12, 16 and 20 degrees, respectively.
Figure 14B:
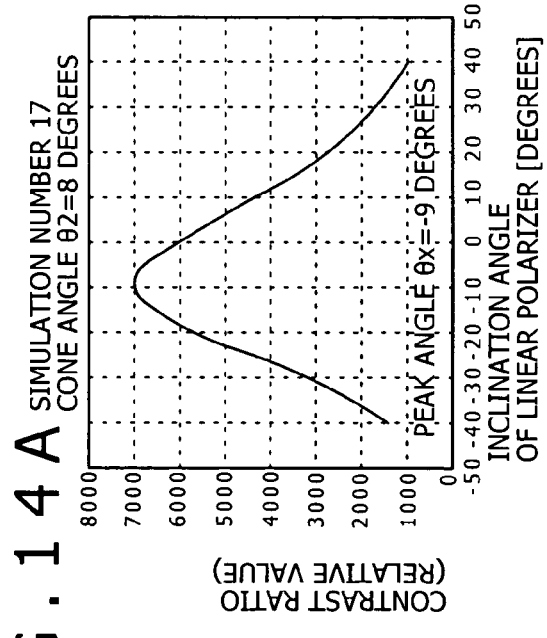
Figure 14C:
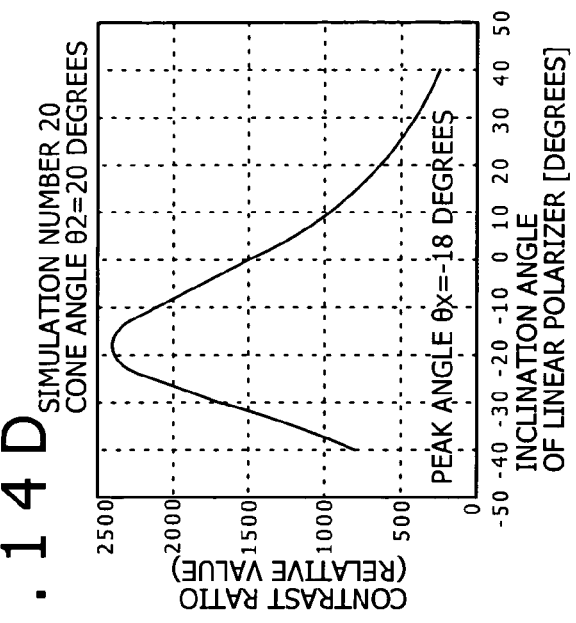
Figure 14D:
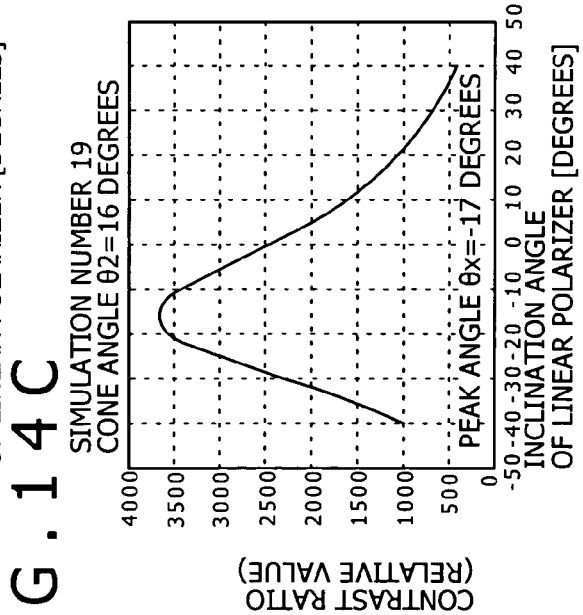
Figure 15A:
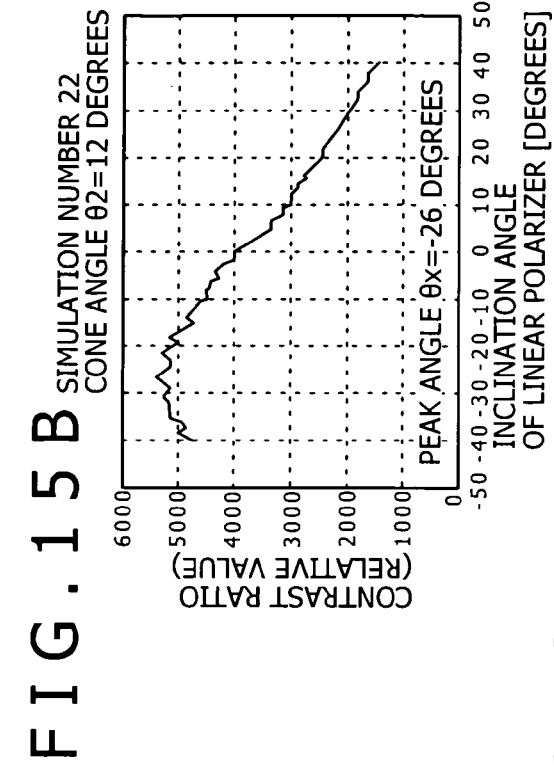
FIGS. 15A to 15D are graphs illustrating a contrast with respect to the inclination angle x where the refractive index of the linearly polarizing element is 2, the refractive index of the polarizing beam splitter is 2.4 and the cone angle is 8, 12, 16 and 20 degrees, respectively.
Figure 15B:
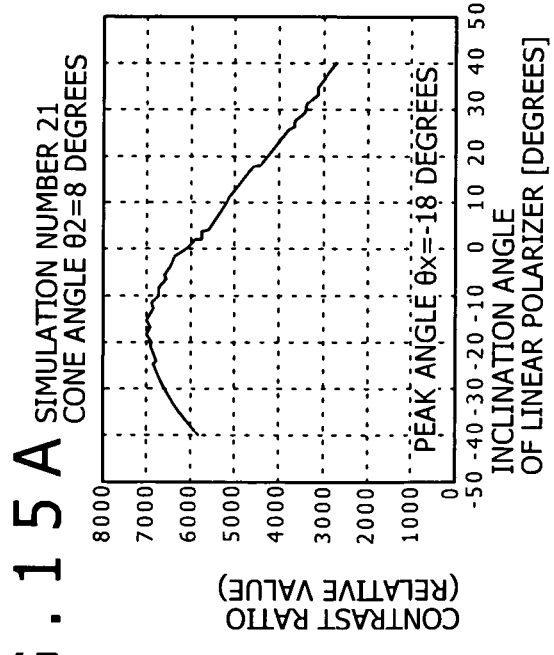
Figure 15C:
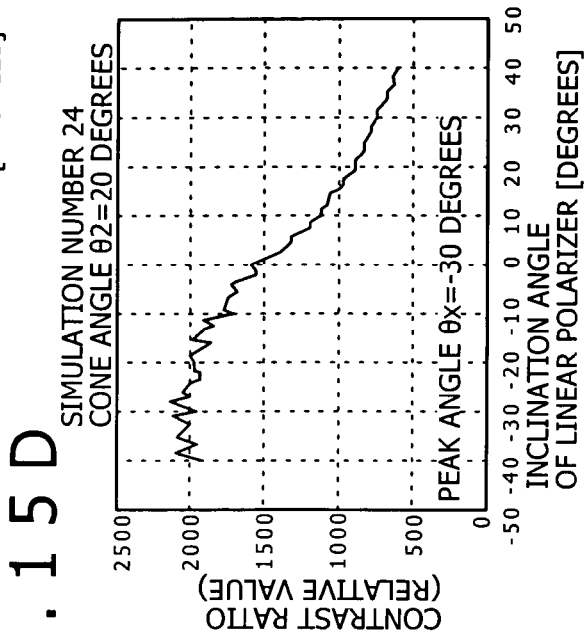
Figure 15D:
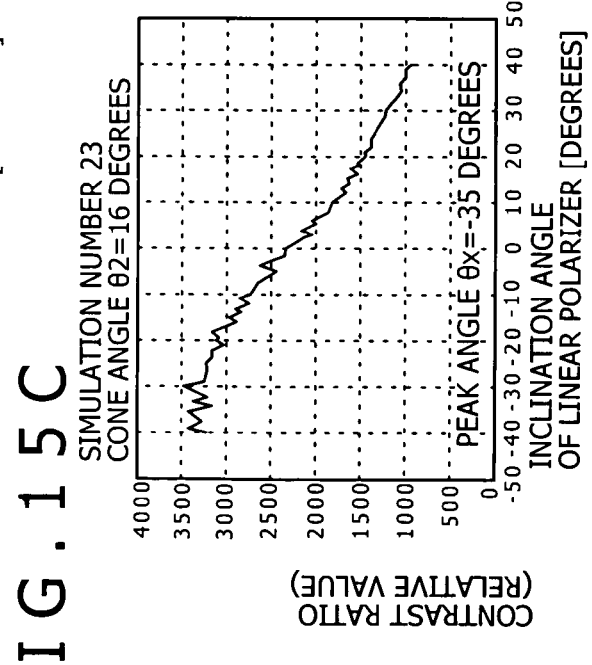
Figure 16:
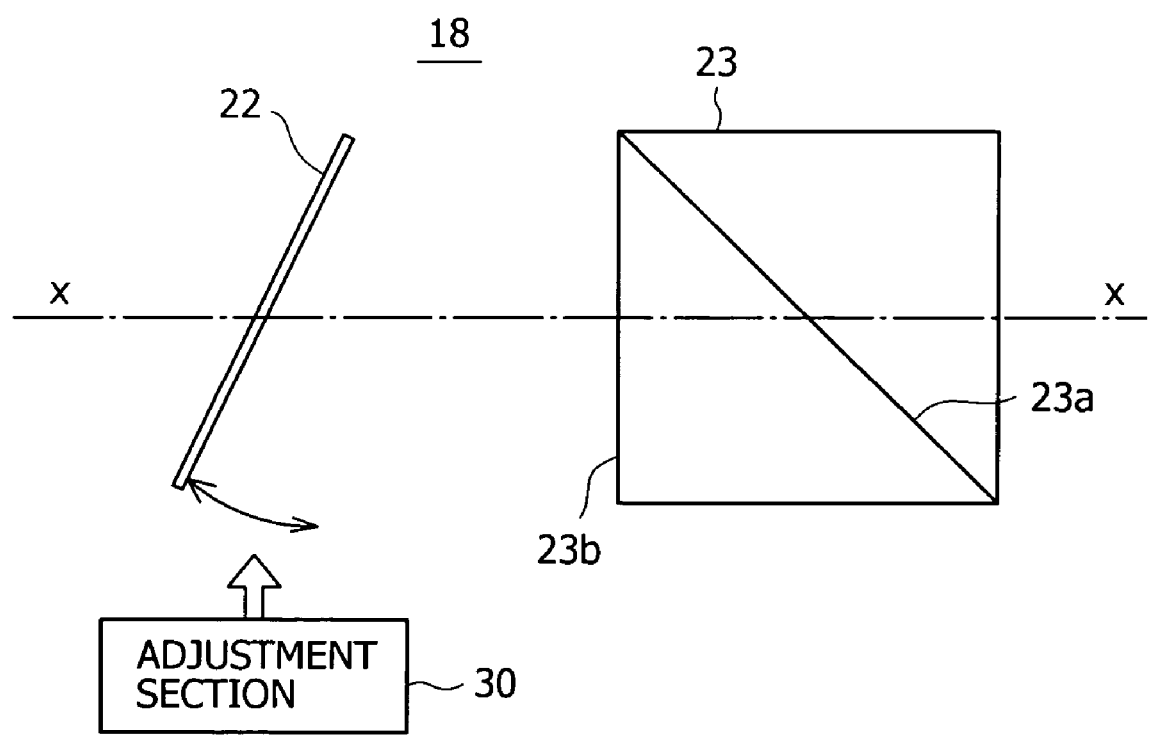
FIG. 16 is a schematic view showing an adjustment section for adjusting the inclination angle of the linear polarizing element.

In contrast, FIGS. 8 and 9 illustrate a relationship between the incident angle to the light demultiplexing face 23a and the polarization condition on the light demultiplexing face 23a where the linearly polarizing element 22 is inclined at the inclination angle $\theta x$=21 degrees. The conditions of the refractive index of the polarizing beam splitter 23 and the refractive index of the linearly polarizing element 22 are same as those in the case of FIGS. 3 and 4.

If the polarization directions (directions of double-sided arrow marks) shown in FIGS. 8 and 9 are compared with those in FIGS. 3 and 4, then it can be seen that they generally approach the directions of the S-wave components (that is, the circumferential directions of the concentric circles) on the light demultiplexing face 23a.

This signifies that the factor which deteriorates the contrast decreases, and an image of a higher quality is projected at a higher contrast on the screen.

Effects by the Arrangement Relationship of the Linearly Polarizing Element and the Polarizing Beam Splitter Now, simulation results of the relative value of the contrast to the inclination angle $\theta x$ of the linearly polarizing element 22 are described.

Referring to FIGS. 10A to 15D, the axis of abscissa represents the inclination angle $\theta x$ and the axis of ordinate represents the relative value of the contrast.

FIGS. 10A to 10D show graphs (simulation numbers 1, 2, 3 and 4) under conditions that the refractive index of the linearly polarizing element 22 is 1, the refractive index of the polarizing beam splitter 23 is 1.4, and the cone angle $\theta_2$ is 8, 12, 16 and 20 degrees, respectively. Under the conditions, the contrast exhibits a peak at the inclination angle $\theta x$=−18 to −26 degrees.

FIGS. 11A to 11D show graphs (simulation numbers 5, 6, 7 and 8) under conditions that the refractive index of the linearly polarizing element 22 is 2, the refractive index of the polarizing beam splitter 23 is 1.4, and the cone angle $\theta_2$ is 8, 12, 16 and 20 degrees, respectively. Under the conditions, the contrast exhibits a peak at the inclination angle $\theta x$=−33 degrees or more.

FIGS. 12A to 12D show graphs (simulation numbers 9, 10, 11 and 12) under conditions that the refractive index of the linearly polarizing element 22 is 1, the refractive index of the polarizing beam splitter 23 is 2, and the cone angle $\theta_2$ is 8, 12, 16 and 20 degrees, respectively. Under the conditions, the contrast exhibits a peak at the inclination angle $\theta x$=−13 to −21 degrees.

FIGS. 13A to 13D show graphs (simulation numbers 13, 14, 15 and 16) under conditions that the refractive index of the linearly polarizing element 22 is 2, the refractive index of the polarizing beam splitter 23 is 2, and the cone angle $\theta_2$ is 8, 12, 16 and 20 degrees, respectively. Under the conditions, the contrast exhibits a peak at the inclination angle $\theta x$=−26 to −40 degrees.

FIGS. 14A to 14D show graphs (simulation numbers 17, 18, 19 and 20) under conditions that the refractive index of the linearly polarizing element 22 is 1, the refractive index of the polarizing beam splitter 23 is 2.4, and the cone angle $\theta_2$ is 8, 12, 16 and 20 degrees, respectively. Under the conditions, the contrast exhibits a peak at the inclination angle $\theta x$=−9 to −18 degrees.

FIGS. 15A to 15D show graphs (simulation numbers 21, 22, 23 and 24) under conditions that the refractive index of the linearly polarizing element 22 is 2, the refractive index of the polarizing beam splitter 23 is 2.4, and the cone angle $\theta_2$ is 8, 12, 16 and 20 degrees, respectively. Under the conditions, the contrast exhibits a peak at the inclination angle $\theta x$=−18 to −35 degrees.

The peak values of the simulation results described above are listed in the following tables.

TABLE 1

| No. | 1 | 2 | 3 | 4 |
|---|---|---|---|---|
| Cone angle $\theta_2$ (degrees) | 8 | 12 | 16 | 20 |
| Refractive index of linearly polarizing element | 1 | 1 | 1 | 1 |
| Refractive index of PBS | 1.4 | 1.4 | 1.4 | 1.4 |
| Peak angle $\theta x$ (degrees) | −18 | −22 | −24 | −26 |

| No. | 5 | 6 | 7 | 8 |
|---|---|---|---|---|
| Cone angle $\theta_2$ (degrees) | 8 | 12 | 16 | 20 |
| Refractive index of linearly polarizing element | 2 | 2 | 2 | 2 |
| Refractive index of PBS | 1.4 | 1.4 | 1.4 | 1.4 |
| Peak angle $\theta x$ (degrees) | −33 | | | |

| No. | 9 | 10 | 11 | 12 |
|---|---|---|---|---|
| Cone angle $\theta_2$ (degrees) | 8 | 12 | 16 | 20 |
| Refractive index of linearly polarizing element | 1 | 1 | 1 | 1 |
| Refractive index of PBS | 2 | 2 | 2 | 2 |
| Peak angle $\theta x$ (degrees) | −13 | −16 | −19 | −21 |

| No. | 13 | 14 | 15 | 16 |
|---|---|---|---|---|
| Cone angle $\theta_2$ (degrees) | 8 | 12 | 16 | 20 |
| Refractive index of linearly polarizing element | 2 | 2 | 2 | 2 |
| Refractive index of PBS | 2 | 2 | 2 | 2 |
| Peak angle $\theta x$ (degrees) | −26 | −33 | −40 | |

| No. | 17 | 18 | 19 | 20 |
|---|---|---|---|---|
| Cone angle $\theta_2$ (degrees) | 8 | 12 | 16 | 20 |
| Refractive index of linearly polarizing element | 1 | 1 | 1 | 1 |
| Refractive index of PBS | 2.4 | 2.4 | 2.4 | 2.4 |
| Peak angle $\theta x$ (degrees) | −9 | −13 | −17 | −18 |

| No. | 21 | 22 | 23 | 24 |
|---|---|---|---|---|
| Cone angle $\theta_2$ (degrees) | 8 | 12 | 16 | 20 |
| Refractive index of linearly polarizing element | 2 | 2 | 2 | 2 |
| Refractive index of PBS | 2.4 | 2.4 | 2.4 | 2.4 |
| Peak angle $\theta x$ (degrees) | −18 | −26 | −35 | −30 |

As seen from the simulation results given above, if the inclination angle $\theta x$ of the linearly polarizing element 22 is set to the minus direction, then the contrast of the projected image increases, and a peak value of the contrast appears at a certain angle.

Accordingly, if the inclination angle $\theta x$ of the linearly polarizing element 22 is set to the peak value, an image of a high quality having a high contrast can be projected on the screen.

Further, the inclination angle $\theta x$ of the linearly polarizing element 22 when the best contrast value is obtained varies depending upon variations of the various conditions. Therefore, the linearly polarizing element 22 may be configured such that the inclination angle $\theta x$ thereof can be increased while an adjustment section 30 for varying the inclination angle $\theta x$ of the linearly polarizing element 22 is provided for the polarizing optical system 18.

It is to be noted that a wire grid polarizer may be used as the linearly polarizing element 22. The wire grid polarizer is structured such that a striped metal (aluminum) layer is disposed on a glass substrate and reflects linearly polarized light polarized in one direction whereas it passes linearly polarized light polarized in the other direction therethrough. The wire grid polarizer has been put into practical use by MOXTEK, Inc.

Where the polarizer has such a structure as described above, the polarizer does not exist in any medium. However, the effective dielectric constant $\epsilon$ can be represented as $\epsilon = \epsilon_0 \cdot (d_0 + d_1)/d_0$, where $\epsilon_0$ represents the refractive index of the air layer, $d_0$ the width of the air layer, and $d_1$ the width of the metal (aluminum) layer. In this instance, where the velocity of light in the vacuum is represented by c and the velocity of light in the medium by v, the wire grid can be regarded as a polarizer existing in a medium of a refractive index n given by the following expression (1):

$$n = c/v = [(d_0 + d_1)/d_0]^{1/2}$$

In accordance with this, for example, in the case of the (width of the metal layer+width of the air layer)/width of the air layer=1.55, the polarizer can be regarded as a linearly polarizing element existing in a medium having a refractive index of 1.24.

It is to be noted that, while, in the example described above, a divergent light flux is introduced to the incidence face 23b of the polarizing beam splitter 23, according to the present invention, the incident light flux need not be a divergent light flux but may be a convergent light flux only if it is not a parallel light flux.

First Modification

Now, a modified example of the polarizing optical system 18 is described.

As described hereinabove, the polarizing optical system 18 uses the linearly polarizing element 22 provided in an inclined relationship in the opposite direction to the light demultiplexing face 23a with respect to a plane parallel to the optical axis X. The linearly polarizing element 22 may be replaced, for example, by such a linearly polarizing element 31 in the form of a flat plate and a half wavelength plate 32 in the form of a flat plate as seen in FIG. 17 or 18. It is to be noted that, since light fluxes in the wavelength bands of red, green and blue individually enter such polarizing beam splitters 32, it is necessary for the polarizing beam splitters 32 to be individually ready for the wavelengths of the incident lights. Further, the half wavelength plate 32 has a uniaxial birefringent medium. In FIG. 17 or 18, a slow axis of the half wavelength plate 32 is parallel to the reference plane which includes the normal to the light demultiplexing face 23a and the optical axis X.

In this instance, the polarizing beam splitter 23, linearly polarizing element 31 and half wavelength plate 32 have such an arrangement relationship as described below.

The linearly polarizing element 31, half wavelength plate 32 and polarizing beam splitter 23 are disposed in order of the linearly polarizing element 31→half wavelength plate 32→polarizing beam splitter 23 on the light path of the incident light flux.

The light demultiplexing face 23a of the polarizing beam splitter 23 is disposed so as to totally reflect light polarized in one direction which has passed through the half wavelength plate 32. In other words, the half wavelength plate 32 and the light demultiplexing face 23a have such an arrangement relationship that the light demultiplexing face 23a is disposed so that light polarized in one direction which has passed through the half wavelength plate 32 is made S polarized light. In other words, the linearly polarizing element 31 and the half wavelength plate 32 are disposed such that the directions of the absorption axes and the anisotropic axes thereof are set so that light having passed through them is introduced as S polarized light to the light demultiplexing face 23a.

The linearly polarizing element 31 and the half wavelength plate 32 are disposed such that, where a plane defined by the normal $Z_1$ to the light demultiplexing face 23a and the optical axis X is determined as a reference plane, the planes of them may be perpendicular to the reference plane.

Further, one or both of the linearly polarizing element 31 and the half wavelength plate 32 are inclined at an acute angle in the opposite direction (minus direction) to the light demultiplexing face 23a with respect to a plane A perpendicular to the optical axis X. In particular, the linearly polarizing element 31 is disposed in parallel to a plane perpendicular to the optical axis X while only the half wavelength plate 32 is inclined in the minus direction as seen in FIG. 17. Alternatively, both the linearly polarizing element 31 and the half wavelength plate 32 are inclined in the minus direction as seen in FIG. 18. Further, only the linearly polarizing element 31 may be inclined in the minus direction while the half wavelength plate 32 is disposed in parallel to a plane perpendicular to the optical axis X.

Also where the linearly polarizing element 31 and the half wavelength plate 32 are disposed in such manners as described above, the contrast of the projected image increases and a peak value of the contrast appears at a certain angle similarly as in the case wherein only the linearly polarizing element 22 is provided. Accordingly, if the inclination angles of the linearly polarizing element 31 and the half wavelength plate 32 are set to a peak value of the contrast, then an image of a high quality having a high contrast can be projected on the screen.

The reason why such arrangements as described above cause the polarization optical axis to approach S polarized light is described below.

Figure 19:
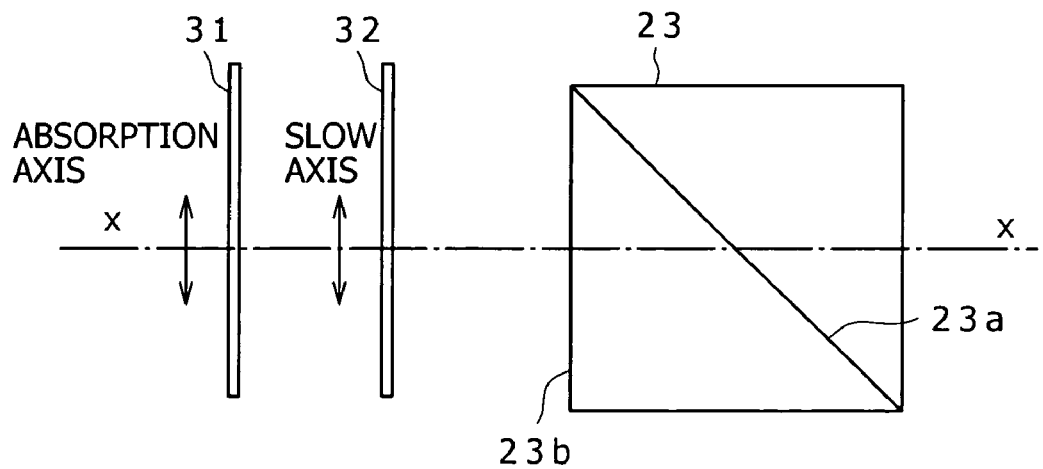
FIG. 19 is a schematic view showing a reflection type liquid crystal projector which includes a linearly polarizing element and a half-wave plate both arranged in parallel to a plane perpendicular to an optical axis X.
Figure 20A:
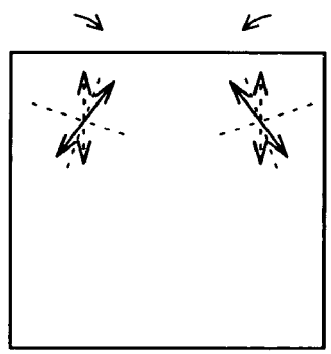
FIGS. 20A to 20C are schematic views illustrating rotation of a slow axis of the half-wave plate.
Figure 20B:
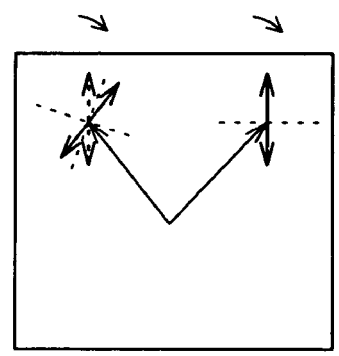
Figure 20C:
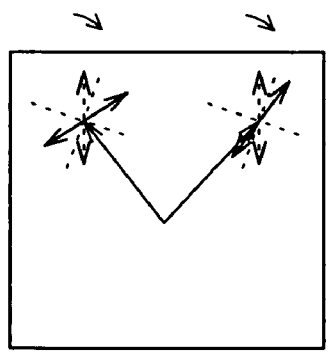
Figure 22:
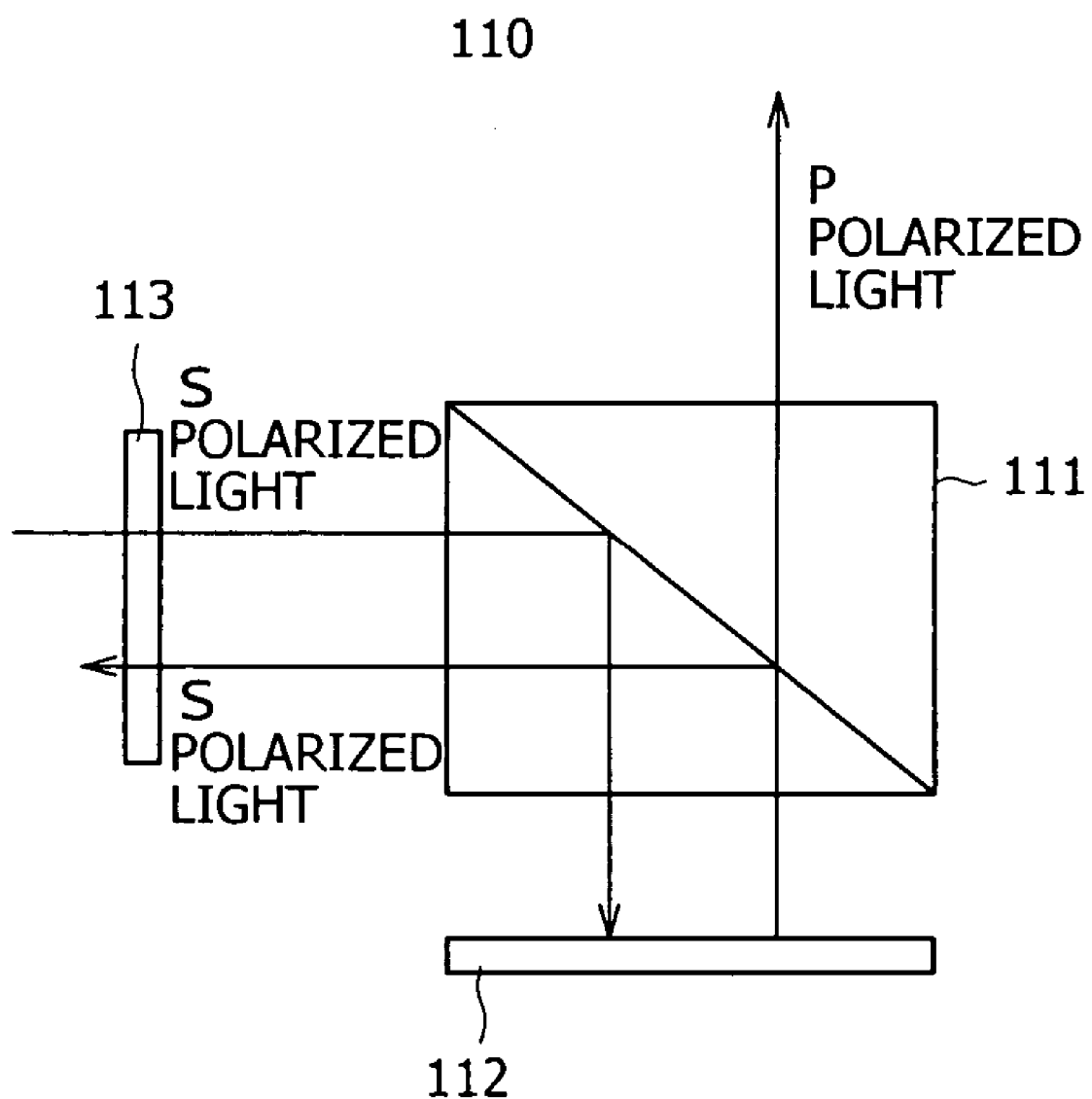
FIG. 22 is a schematic view showing a configuration of a liquid crystal element and associated elements of a conventional projection type image display apparatus.

It is assumed that the linearly polarizing element 31 and the half wavelength plate 32 are arranged in parallel to a plane perpendicular to the optical axis X as shown in FIG. 19. In this instance, the polarization directions of incident light are adjusted to the direction of the transmission axis of the linearly polarizing element 31, and after then, the incident light enters the half wavelength plate 32. FIG. 20A illustrates a relationship between the polarization axis of a light ray entering obliquely into the half wavelength plate 32 and the optical axis (slow axis, fast axis) of the wavelength plate as viewed from the light ray. In FIGS. 20A to 20C, a square represents the half wavelength plate 32; cross lines represent an optical axis of the half wavelength plate 32; a double sided allow mark of a broken line represents the polarization direction of light before it enters the half wavelength plate 32; and an arrow mark of a solid line represents the polarization direction of the light after emerging from the half wavelength plate 32. As can be seen from FIG. 20A, when the light ray passes through the half wavelength plate 32, the polarization direction is inclined to the inner side (in the direction indicated by an arrow mark in FIG. 20A).

Further, the half wavelength plate 32 is inclined in the opposite direction to the light modulating face 23a with respect to a plane parallel to the optical axis X. In this instance, the slow axis rotates as seen in FIGS. 20B and 20C, and as a result, also the polarization direction of the light after passing through the half wavelength plate 32 changes. The polarization axis of the variation approaches the S wave component on the light demultiplexing face 23a of the polarizing beam splitter 23.

Second Modification

Now, another example wherein the location of the linearly polarizing element 22 is modified is described.

In the reflection type projector 10, the linearly polarizing element 22 is disposed between the field lens 21 and the polarizing beam splitter 23 as described hereinabove. However, the linearly polarizing element 22 in the G and B polarizing optical systems 18-G and 18-B may be disposed between the first dichroic mirror 15 and the second dichroic mirror 16 as seen in FIG. 21. In this instance, a single element can be used commonly as the linearly polarizing elements 22 of the G and B polarizing optical systems 18-G and 18-B. Accordingly, the number of linearly polarizing elements 22 can be reduced, and consequently, an image having a high contrast can be displayed at a reduced cost.

While preferred embodiments of the present invention have been described using specific terms, such description is for illustrative purposes only, and it is to be understood that changes and variations may be made without departing from the spirit or scope of the following claims.

What is claimed is:

1. A projection type image display apparatus, comprising:
    a linearly polarizing element in the form of a flat plate for emitting light polarized in one direction from within a flux of light incident along an optical axis;
    a polarizing beam splitter disposed in an inclined relationship to a predetermined angle with respect to a plane perpendicular to the optical axis and having a demultiplexing face which passes S or P polarized light therethrough but reflects polarized light having a polarization direction perpendicular to that of the polarized light which passes through said demultiplexing face, said polarizing beam splitter receiving, at the demultiplexing face thereof, the flux of light emitted from said linearly polarized element;
    a light modulation section for receiving the flux of light emitted from the demultiplexing face of said polarizing beam splitter, changing the polarization direction of the received flux of light in accordance with an image signal and reflecting the flux of light so as to be introduced back to the demultiplexing face of said polarizing beam splitter; and
    an adjustment section for adjusting an angle of said linearly polarizing element, said linearly polarizing element being set to an angle at which the light having passed through said beam splitter after reflected by said light modulation section exhibits a maximum contrast;
    said linearly polarizing element being disposed in such a manner as to extend perpendicularly to a reference plane which includes a normal to the demultiplexing face and the optical axis and be inclined at an acute angle in the opposite direction to the demultiplexing face with respect to the plane perpendicular to the optical axis.

2. The projection type image display apparatus according to claim 1, wherein said linearly polarizing element is a reflection type polarizer which passes light polarized in the one direction from within the incident flux of light therethrough but reflects light polarized in any other direction.

3. A projection type image display apparatus, comprising:
    a linearly polarizing element in the form of a flat plate for emitting light polarized in one direction from within a flux of light incident along an optical axis;

a wavelength plate for receiving the flux of light emitted from said linearly polarizing element and shifting the polarization direction of the received flux of light;

a polarizing beam splitter disposed in an inclined relationship to a predetermined angle with respect to a plane perpendicular to the optical axis and having a demultiplexing face which passes S or P polarized light therethrough but reflects polarized light having a polarization direction perpendicular to that of the polarized light which passes through said demultiplexing face, said polarizing beam splitter receiving, at the demultiplexing face thereof, the flux of light emitted from said linearly polarized element;

a light modulation section for receiving the flux of light emitted from the demultiplexing face of said polarizing beam splitter, changing the polarization direction of the received flux of light in accordance with an image signal and reflecting the flux of light so as to be introduced back to the demultiplexing face of said polarizing beam splitter; and an adjustment section for adjusting an angle of at least one of said linearly polarizing element and said wavelength plate, at least one of said linearly polarizing element and said wavelength plate being set to an angle at which the light having passed through said beam splitter after reflected by said light modulation section exhibits a maximum contrast;

said linearly polarizing element and/or said wavelength plate being disposed in such a manner as to extend perpendicularly to a reference plane which includes a normal to the demultiplexing face and the optical axis and be inclined at an acute angle in the opposite direction to the demultiplexing face with respect to the plane perpendicular to the optical axis.

4. The projection type image display apparatus according to claim 3, wherein said linearly polarizing element is a reflection type polarizer which passes light polarized in the one direction from within the incident flux of light therethrough but reflects light polarized in any other direction.

5. The projection type image display apparatus according to claim 3, wherein said wavelength plate emits light having a phase different by $\lambda/2$ from a phase of the incident light which has a wavelength $\lambda$.

6. The projection type image display apparatus according to claim 5, wherein said wavelength plate is a uniaxial birefringent plate having a slow axis which is parallel to the reference plane which includes the normal to the demultiplexing face and the optical axis.

7. An optical system, comprising:

a linearly polarizing element in the form of a flat plate for emitting light polarized in one direction from within a flux of light incident along an optical axis;

a polarizing beam splitter disposed in an inclined relationship to a predetermined angle with respect to a plane perpendicular to the optical axis and having a demultiplexing face which passes S or P polarized light therethrough but reflects polarized light having a polarization direction perpendicular to that of the polarized light which passes through said demultiplexing face, said polarizing beam splitter receiving, at the demultiplexing face thereof, the flux of light emitted from said linearly polarized element; and an adjustment section for adjusting an angle of said linearly polarizing element, said linearly polarizing element is set to an angle at which the ratio at which the component of S or P polarized light from within the polarized light illuminated on said polarizing beam splitter is included exhibits a maximum value;

said linearly polarizing element being disposed in such a manner as to extend perpendicularly to a reference plane which includes a normal to the demultiplexing face and the optical axis and be inclined at an acute angle in the opposite direction to the demultiplexing face with respect to the plane perpendicular to the optical axis.

8. The optical system according to claim 7, wherein said linearly polarizing element is a reflection type polarizer which passes light polarized in the one direction from within the incident flux of light therethrough but reflects light polarized in any other direction.

9. An optical system, comprising:

a linearly polarizing element in the form of a flat plate for emitting light polarized in one direction from within a flux of light incident along an optical axis;

a wavelength plate for receiving the flux of light emitted from said linearly polarizing element and shifting the polarization direction of the received flux of light;

a polarizing beam splitter disposed in an inclined relationship to a predetermined angle with respect to the optical axis and having a demultiplexing face which passes S or P polarized light therethrough but reflects polarized light having a polarization direction perpendicular to that of the polarized light which passes through said demultiplexing face, said polarizing beam splitter receiving, at the demultiplexing face thereof, the flux of light emitted from said linearly polarized element; and an adjustment section for adjusting an angle of at least one of said linearly polarizing element and said wavelength plate, at least one of said linearly polarizing element and said polarizing plate being set to an angle at which the ratio at which the component of light polarized in the one direction from within the polarized light illuminated on said polarizing beam splitter is included exhibits a maximum value;

said linearly polarizing element and/or said wavelength plate being disposed in such a manner as to extend perpendicularly to a reference plane which includes a normal to the demultiplexing face and the optical axis and be inclined at an acute angle in the opposite direction to the demultiplexing face with respect to the plane perpendicular to the optical axis.

10. The optical system according to claim 9, wherein said linearly polarizing element is a reflection type polarizer which passes light polarized in the one direction from within the incident flux of light therethrough but reflects light polarized in any other direction.

11. The optical system according to claim 9, wherein said wavelength plate emits light having a phase different by $\lambda/2$ from a phase of the incident light which has a wavelength $\lambda$.

12. The optical system according to claim 11, wherein said wavelength plate is a uniaxial birefringent plate having a slow axis which is parallel to the reference plane which includes the normal to the demultiplexing face and the optical axis.

13. A projection type image display apparatus, comprising:

a linearly polarizing element in the form of a flat plate for emitting light polarized in one direction from within a flux of light incident along an optical axis;

a wavelength plate for receiving the flux of light emitted from said linearly polarizing element and shifting the polarization direction of the received flux of light;

a polarizing beam splitter disposed in an inclined relationship to a predetermined angle with respect to a plane perpendicular to the optical axis and having a demultiplexing face which passes S or P polarized light therethrough but reflects polarized light having a polarization direction perpendicular to that of the polarized light which passes through said demultiplexing face, said polarizing beam splitter receiving, at the demultiplexing face thereof, the flux of light emitted from said linearly polarized element; and a light modulation section for receiving the flux of light emitted from the demultiplexing face of said polarizing beam splitter, changing the polarization direction of the received flux of light in accordance with an image signal and reflecting the flux of light so as to be introduced back to the demultiplexing face of said polarizing beam splitter;

said linearly polarizing element and/or said wavelength plate being disposed in such a manner as to extend perpendicularly to a reference plane which includes a normal to the demultiplexing face and the optical axis and be inclined at an acute angle in the opposite direction to the demultiplexing face with respect to the plane perpendicular to the optical axis, wherein said wavelength plate emits light having a phase different by $\lambda/2$ from a phase of the incident light which has a wavelength $\lambda$.

14. The projection type image display apparatus according to claim 13, wherein said linearly polarizing element and/or said wavelength plate is set to an angle at which the light having passed through said beam splitter after reflected by said light modulation section exhibits a maximum contrast.

15. The projection type image display apparatus according to claim 14, further comprising an adjustment section for adjusting the angle of said linearly polarizing element and/or said wavelength plate.

16. The projection type image display apparatus according to claim 13, wherein said linearly polarizing element is a reflection type polarizer which passes light polarized in the one direction from within the incident flux of light therethrough but reflects light polarized in any other direction.

17. The projection type image display apparatus according to claim 13, wherein said wavelength plate is a uniaxial birefringent plate having a slow axis which is parallel to the reference plane which includes the normal to the demultiplexing face and the optical axis.

18. An optical system, comprising:

a linearly polarizing element in the form of a flat plate for emitting light polarized in one direction from within a flux of light incident along an optical axis;

a wavelength plate for receiving the flux of light emitted from said linearly polarizing element and shifting the polarization direction of the received flux of light; and a polarizing beam splitter disposed in an inclined relationship to a predetermined angle with respect to a plane perpendicular to the optical axis and having a demultiplexing face which passes S or P polarized light therethrough but reflects polarized light having a polarization direction perpendicular to that of the polarized light which passes through said demultiplexing face, said polarizing beam splitter receiving, at the demultiplexing face thereof, the flux of light emitted from said linearly polarized element;

said linearly polarizing element and/or said wavelength plate being disposed in such a manner as to extend perpendicularly to a reference plane which includes a normal to the demultiplexing face and the optical axis and be inclined at an acute angle in the opposite direction to the demultiplexing face with respect to the plane perpendicular to the optical axis, wherein said wavelength plate emits light having a phase different by $\lambda/2$ from a phase of the incident light which has a wavelength $\lambda$.

19. The optical system according to claim 18, wherein said linearly polarizing element and/or said polarizing plate is set to an angle at which the ratio at which the component of light polarized in the one direction from within the polarized light illuminated on said polarizing beam splitter is included exhibits a maximum value.

20. The optical system according to claim 19, further comprising an adjustment section for adjusting the angle of said linearly polarizing element and/or said wavelength plate.

21. The optical system according to claim 18, wherein said linearly polarizing element is a reflection type polarizer which passes light polarized in the one direction from within the incident flux of light therethrough but reflects light polarized in any other direction.

22. The optical system according to claim 18, wherein said wavelength plate is a uniaxial birefringent plate having a slow axis which is parallel to the reference plane which includes the normal to the demultiplexing face and the optical axis.

* * * * *